United States Patent [19]

Miyake et al.

[11] Patent Number: 5,428,472
[45] Date of Patent: Jun. 27, 1995

[54] OPTICAL SCAN DEVICE HAVING AN OPTICAL DIFFRACTION GRATING ELEMENT

[75] Inventors: Takahiro Miyake; Yoshio Yoshida; Yukio Kurata, all of Tenri, Japan

[73] Assignee: Sharp Kabushiki Kaisha, Osaka, Japan

[21] Appl. No.: 114,140

[22] Filed: Aug. 31, 1993

Related U.S. Application Data

[62] Division of Ser. No. 503,039, Apr. 2, 1990, Pat. No. 5,283,690.

[30] Foreign Application Priority Data

Apr. 4, 1989 [JP] Japan .................................. 1-85510
Mar. 7, 1990 [JP] Japan .................................. 2-57472

[51] Int. Cl.⁶ .......................... G02B 5/18; G02B 27/44
[52] U.S. Cl. .................................. 359/197; 359/209; 359/569; 359/575; 369/109
[58] Field of Search ............... 359/566, 569, 571, 575, 359/197, 209, 17, 18; 369/103, 109, 112, 275.1

[56] References Cited

U.S. PATENT DOCUMENTS

| | | |
|---|---|---|
| 755,983 | 3/1904 | Wood . |
| 4,733,065 | 3/1988 | Hoshi et al. . |
| 4,874,941 | 10/1989 | Spillman, Jr. ........................ 359/566 |
| 4,945,529 | 7/1990 | Ono et al. ............................ 359/566 |
| 4,983,017 | 1/1991 | Tsuji et al. .......................... 369/109 |

FOREIGN PATENT DOCUMENTS

| | | |
|---|---|---|
| 0122783 | 4/1984 | European Pat. Off. . |
| 228620 | 7/1987 | European Pat. Off. . |
| 2081893A | 7/1981 | United Kingdom . |

OTHER PUBLICATIONS

Patent Abstract of Japan vol. 6, No. 229 (P-155) Nov. 16, 1982 JP-A-57130023, Cannon KK Aug. 12, 1982.
Patent Abstract of Japan vol. 12, No. 494 (P-805) 3341, Dec. 23, 1988, JP-A-63-205,605 Kuraray Aug. 25, 1988.
Y. Aoyagi & S. Nomdea, "How to Control the Groove Configuration of a Holographic Grating," Jon Beam Etching Method Applied Physics, vol. 45, No. 7, 1976.
Y. Kimura et al. "An Optical Head Using Multi-Functional Hologram for CD Player" Optical Memory Sign '86, Tokyo (1986).
"Asymmetrical Trapezoidal Grating Efficiency" to Mashey et al., *Applied Optics*, vol. 26, No. 14, pp. 2864–2866.

*Primary Examiner*—Ricky Shafer

[57] ABSTRACT

An optical scan device comprising a light source and an optical diffraction grating element movable relatively to the light source, which is designed to substantially linearly scan a recording medium in a predetermined direction with a uniform light amount of a light beam emitted from the light source as the optical diffraction grating element moves relatively to the light source. The optical diffraction grating element comprising diffraction gratings having a configuration in which grooves and flat lands each positioned between the adjacent grooves are successively alternately formed, wherein the diffraction gratings have the same groove depth, groove width and groove tilt angle in order to obtain a constant 0th-order diffraction efficiency and first-order diffraction efficiency in the optical diffraction grating element while the pitches of the diffraction gratings are made different by setting a different land width for each diffraction grating.

3 Claims, 30 Drawing Sheets

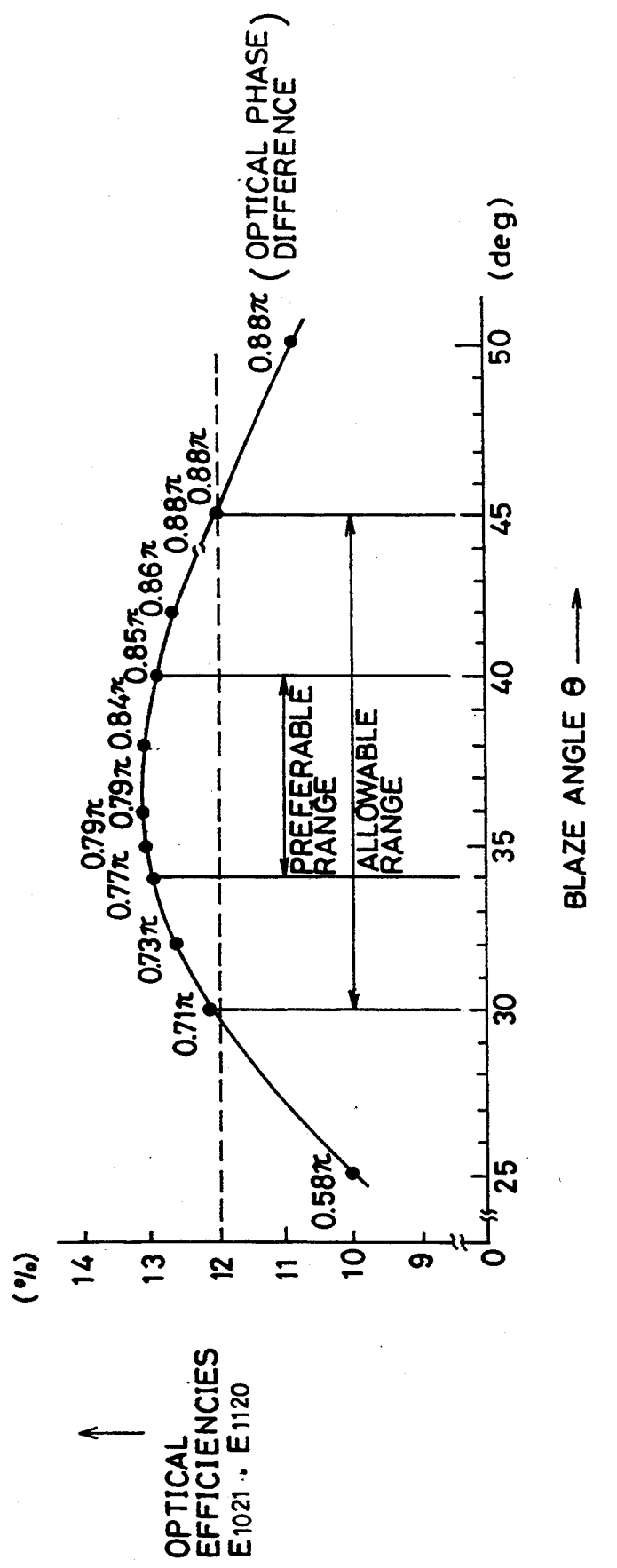

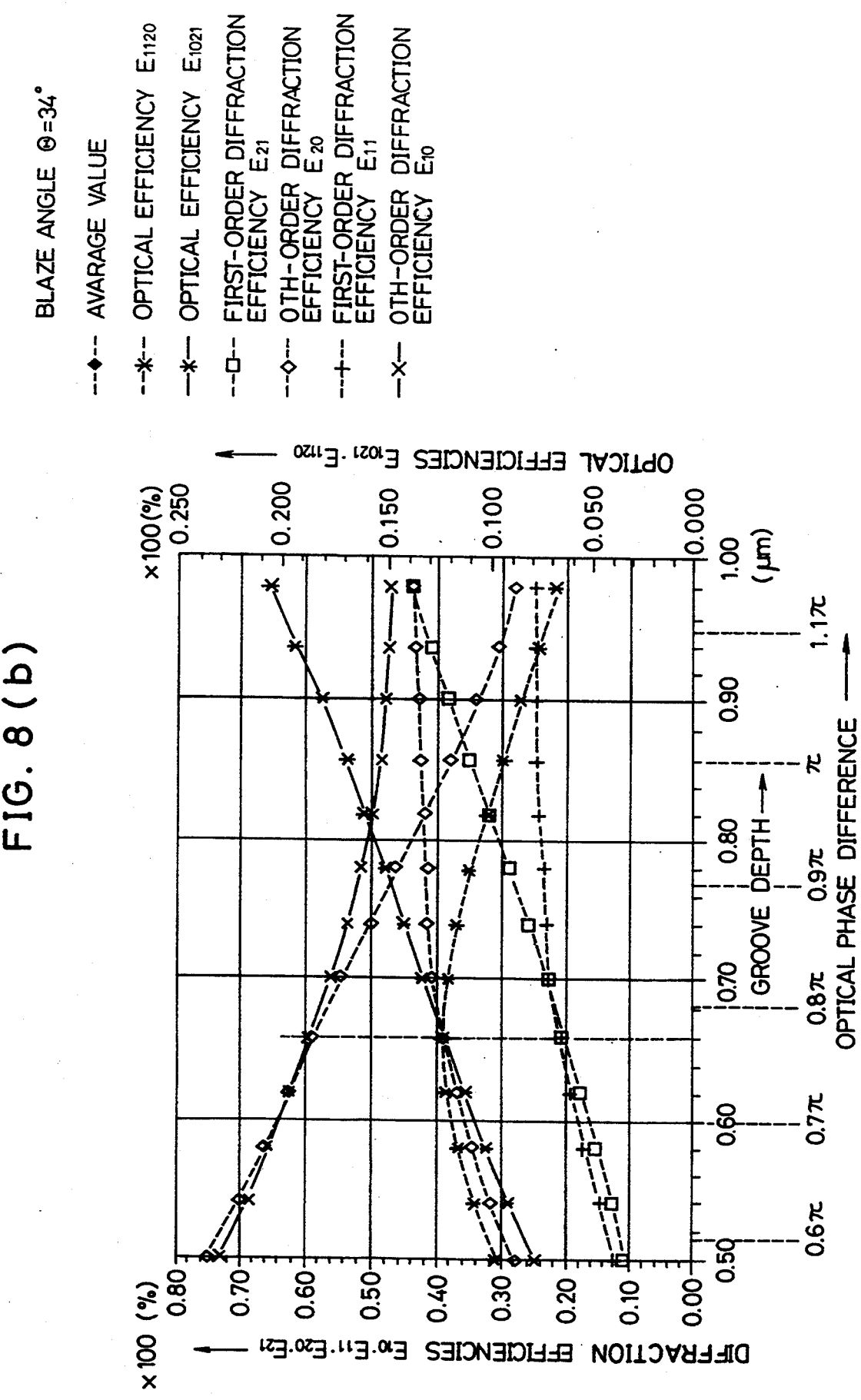

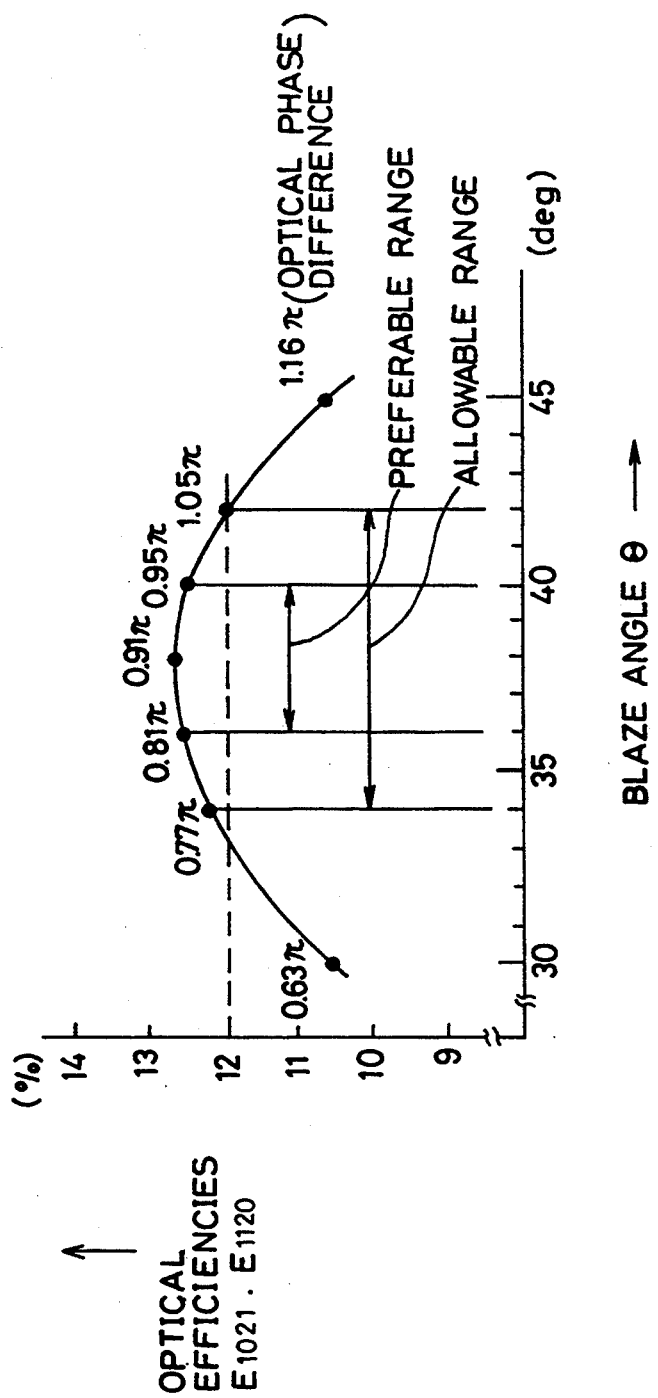

FIG.13
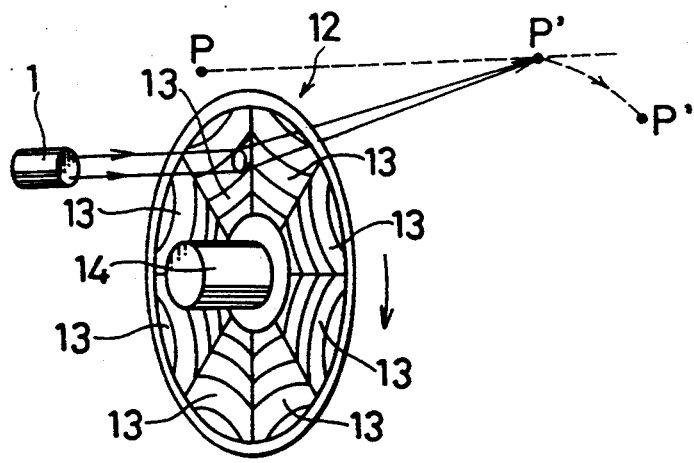
FIG.14(a)
FIG.14(b)
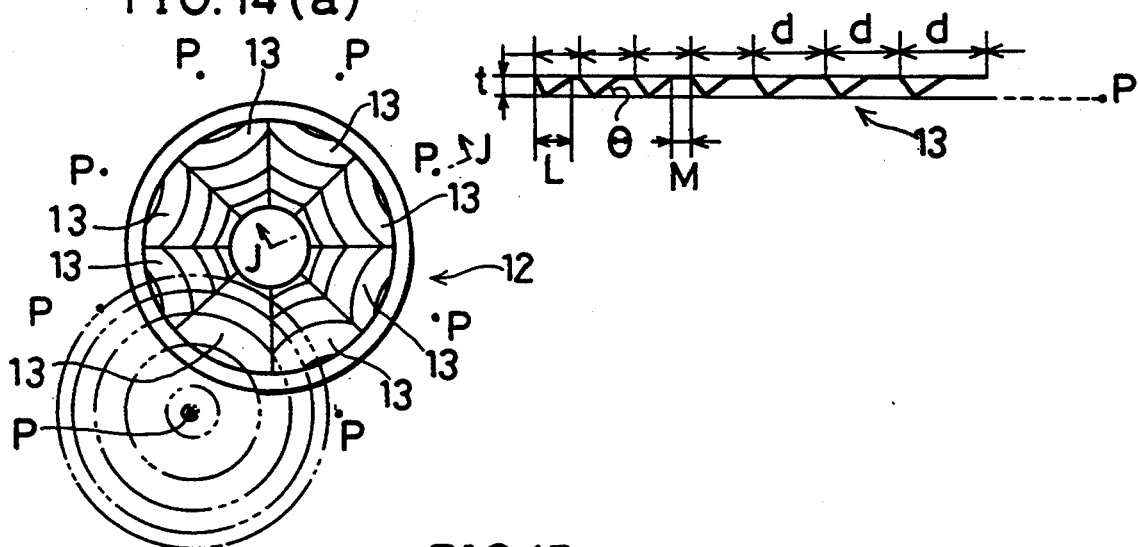
FIG.15
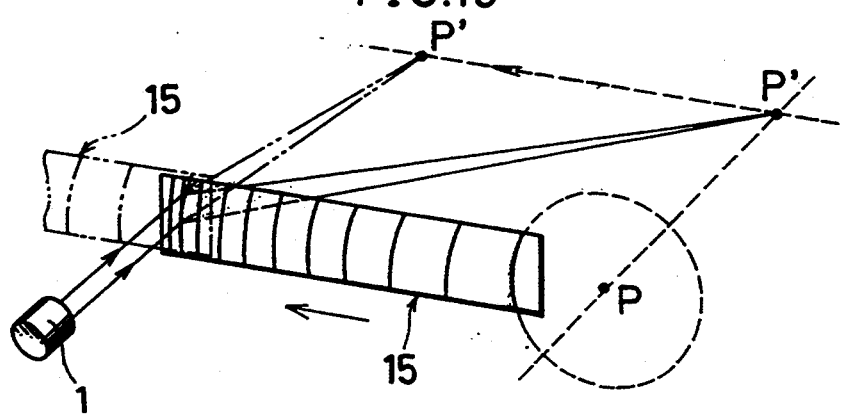

OPTICAL SCAN DEVICE HAVING AN OPTICAL DIFFRACTION GRATING ELEMENT

This application is a divisional of application Ser. No. 07/503,039, filed on Apr. 2, 1990, now U.S. Pat. No. 5,283,690 issued Feb. 1, 1994, the entire contents of which are hereby incorporated by reference.

FIELD OF THE INVENTION

The present invention relates to optical pick-up devices suitable for being adapted to a compact disk player, video disk player and optical recording/reproducing apparatus of both write-once type and rewritable type; and to optical scan devices suitable for being adapted to an optical card recording/reproducing apparatus and laser beam printer. The invention particularly relates to optical diffraction grating elements used for the optical systems of the above apparatus.

BACKGROUND OF THE INVENTION

FIG. 19 shows the side view of an optical pick-up device comprising a conventional optical diffraction grating element 22. A laser beam emitted from a semiconductor laser 21 is focused on a recording medium 25 through an optical diffraction grating element 22, a collimating lens 23 and an objective lens 24. The reflected light from the recording medium 25 passes through the objective lens 24 and the collimating lens 23 and then is diffracted by the optical diffraction grating element 22 so as to be focused on two points on a light receiving element 26.

The optical diffraction grating element 22 is comprised of, as shown in FIG. 21(a), two regions 22a and 22b having different grating pitches. The values of grating pitches $d_{21}$ and $d_{22}$ in the regions 22a and 22b are determined such that lights, which are incident on the regions 22a and 22b after being reflected at the recording medium 25, are converged to two points on the boundaries of the light receiving element 26 as described above.

With reference to the perspective view of FIG. 23, the forming process of the focused light spots will be explained in more detail on assumption that the grating pitch $d_{21}$ < the grating pitch $d_{22}$. The 0th-order diffracted light of a laser beam (indicated by the solid line in FIG. 23) incident on the region 22a after being emitted from the semiconductor laser 21 is converted to a parallel beam at the collimating lens 23. Thereafter, the light beam passes through the objective lens 24 so as to be focused on a point on an optical axis R of the recording medium 25 and reflected thereat. The reflected light is projected back to the region 22b through the objective lens 24 and the collimating lens 23. One of the first-order diffracted lights produced at the region 22b is focused to form a focused light spot $S_{21}$ on the light receiving element 26. On the other hand, the 0th-order diffracted light of a laser beam (indicated by the chain double-dashed line in FIG. 23) incident on the region 22b having a relatively large diffraction pitch $d_{22}$, after being emitted from the semiconductor laser 21 is reflected back to the region 22a whose diffraction pitch $d_{21}$ is relatively small, through the objective lens 24 and the collimating lens 23. One of the first-order diffracted lights produced at the region 22a, which has a relatively large diffraction angle, is focused on the light receiving element 26 to form a focused light spot $S_{22}$.

The focused light spots $S_{21}$ and $S_{22}$ and the emission center of the semiconductor laser 21 are aligned on the same plane and the direction of the array (indicated by the arrow Q in FIG. 23) is parallel with the track direction of the recording medium 25.

The light receiving element 26 is equally divided into four light receiving sections 26a, 26b, 26c and 26d as shown in FIG. 20. On the basis of output signals Sa to Sd released from the light receiving sections 26a to 26d by Push-Pull Method, a radial error signal RES is obtained by the following equation: RES=-(Sa+Sb)−(Sc+Sd). The objective lens 24 is actuated such that the value of the radial error signal RES becomes zero. As a result, the laser beam emitted from the semiconductor laser 21 is accurately focused on the data recording track of the recording medium 25. When the radial error signal RES is zero, the center of the focused light spot $S_{21}$ is positioned on the boundary of the light receiving sections 26a and 26b, and the center of the focused light spot $S_{22}$ is positioned on the boundary of the light receiving sections 26c and 26d.

It is well known that a teeth-saw-configuration, in which longer one of two inclined surfaces composing a groove has a predetermined groove tilt angle $\Theta$, is most suitable for the configuration of the optical diffraction grating element 22, since a diffraction grating element in this configuration possesses a particularly high diffraction efficiency. For fabricating a diffraction grating element in the teeth-saw-configuration, Ion Beam Etching Method is widely known. In this method, a material such as GaAs and PMMA, that can be etched by ion beams at faster speed than photoresist 27 to be covered thereon, is used as a substrate 28 to be processed. The photoresist 27 covered on the substrate 28 is masked with a grating that is produced by a holographic method, and processed to be in the condition shown in FIG. 22(a). Thereafter, ion beams are obliquely projected onto the substrate 28 at a fixed incident angle so that the incident direction of the ion beams is orthogonal to the direction in which the photoresist 27 extends. The above ion beams are made from e.g. Ar gas. As shown in FIG. 22(b), the photoresist 27 formed on the substrate 28 has pinning functions, and the substrate 28 is etched with the photoresist 27 serving as a vertex.

In the case the ion beams are made from Ar gas, the section of the diffraction grating finally obtained is as shown in FIG. 22(c): i.e., the grating is composed of (i) an inclined surface having a groove tilt angle $\Theta$ which has a certain relation to the incident angle of the ion beams, and (ii) an inclined surface perpendicular to the first inclined surface.

In the process of fabricating, by Ion Beam Etching Method, the optical diffraction grating element having different-pitched regions by which incident light thereon is diffracted in different directions and focused, diffraction gratings having different pitches are manufactured at the same time in view of the simplified manufacturing process, productivity and low cost. With the conventional processing method, diffraction gratings having different pitches $d_{21}$ and $d_{22}$ are obtained by either of the following ways: (i) the diffraction gratings are made identical in the groove depth t but different from each other in the groove width L and the width M of the land that is a flat surface between the successive grooves (see FIGS. 21(b) and 21(c)); and (ii) the diffraction gratings are made different from each other in the groove depth t and the configurations thereof are made analogous (see FIGS. 21(d) and 21(e)). The grating pitches of the diffraction gratings are, thus, made different from each other by varying the groove configuration or groove size. This, however, causes the regions 22a and 22b of the optical diffraction grating element 22 shown in FIG. 21(a) to have different diffraction efficiencies. As a result, a difference is caused between the light amounts of the two focused light spots $S_{21}$ and $S_{22}$ which are formed on the light receiving element 26. This is because the focused light spot $S_{21}$ for example is formed by light undergone 0th-order diffraction at one region (e.g. the region 22a) and first-order diffraction at the other region (e.g. the region 22b). Therefore, it is understood that the light amounts of the focused light spots $S_{21}$ and $S_{22}$ respectively depend on the product of the 0th-order diffraction efficiency at one region of the optical diffraction grating element 22 and the first-diffraction efficiency at the other region thereof (this product is hereinafter referred to as "optical efficiency"). If the lights amounts of the focused light spots $S_{21}$ and $S_{22}$ differ from each other, there arises such a drawback that even when the focal point of the objective lens 24 is accurately positioned on the data recording track of the recording medium 25, the radial error signal RES does not become zero and therefore an offset is required.

There is still another disadvantage that a laser beam cannot be focused on the recording medium 25 in good condition because the laser beam is diffracted at the regions 22a and 22b with different diffraction efficiencies, in the forwarding path.

Further, unless the optical diffraction grating element 22 is designed such that the optimum 0th-order diffraction efficiency of one region and the first-order diffraction efficiency of the other region are optimum, the optical efficiency (the product of them), namely, the light amounts of the focused light spots $S_{21}$ and $S_{22}$ formed on the light receiving element 26 will be low. If such an optical diffraction grating element 22 is used for e.g. an optical pick-up adapted to a video disk player wherein analog signals are recorded and reproduced by FM modulation, a S/N ratio necessary for the processing of video signals cannot be obtained.

If the optical diffraction grating element 22 is used for an optical pick-up adapted to a compact-disk player, the signal strength depending on the light amounts of the focused light spot $S_{21}$ and $S_{22}$ will be decreased. In order to solve this problem, i.e., a decrease in the signal strength, the following measures have been conventionally taken: the sensitivity of the light receiving element 26, the amplification factor of electric signals, and/or the power of the semiconductor laser 21 are increased. Consequently the members of the optical pick-up other than the optical diffraction grating element 22 are overloaded in order to obtain high quality read-out signals. This causes an increase in the production cost.

Furthermore, in the case the optical diffraction grating element 22 is adapted to an optical scan device in which a light source for emitting a laser beam and optical diffraction grating element are provided so as to be relatively movable to each other, and in which linear scanning operation is performed by diffracting a laser beam from the light source by the optical diffraction grating element, the diffraction efficiency is also varied depending on the regions of the optical diffraction grating element 22. This makes it impossible to perform scanning operation with a constant light amount.

SUMMARY OF THE INVENTION

One of the objects of the present invention is to provide an optical diffraction grating element having a constant diffraction efficiency and grating pitch varied with the regions.

Another object of the present invention is to provide an optical pick-up wherein the above optical diffraction grating element is employed so as to obtain a sufficient S/N ratio required for the processing of signals in an optical recording/reproducing apparatus.

Further object of the present invention is to provide an optical scan device wherein the above optical diffraction grating element is employed so as to produce beams of uniform light amounts for performing scanning operation.

In order to achieve the above objects, in the optical diffraction grating element according to the present invention, the groove depth, groove width and groove tilt angle are respectively uniformed in the regions while the grating pitch is varied by changing the width of the land formed between the successive grooves.

With the above arrangement, even though the grating pitches of the regions are made different from each other by setting different land widths, the configurations of the grooves in the regions are identical and therefore the 0th-order diffraction efficiency and first order diffraction efficiency of the optical diffraction grating element become constant. Further, the optical efficiencies each obtained by the product of the 0th-order diffraction efficiency in one region and the first-order diffraction efficiency in the other region show sufficient value so that the the optical diffraction grating element can be used for the optical system of an optical pick-up device adapted to a compact disk player, video disk player and optical recording/reproducing apparatus of both write-once type and rewritable type.

In the optical pick-up device of the invention, the optical diffraction grating element positioned between the light source and a recording medium, which guides a light beam reflected at the recording medium after emitting from the light source to the light receiving element, has grooves having the identical configuration.

In the above arrangement, the light beam emitted from the light source is diffracted at the optical diffraction grating element so as to be accurately focused on the recording medium because the 0th-diffraction efficiency and first-diffraction efficiency of the optical diffraction grating element are respectively constant even though the optical diffraction grating element has different grating pitches. In addition, the optical diffraction grating element diffracts reflected light from the recording medium to produce diffracted lights of an equal amount and therefore a plurality of focused light spots having the same light amount are formed on the light receiving surface of the light receiving element. This permits the tracking control operation to be accurately performed based on the light distribution on the light receiving surface of the light receiving element. As a result, the quality of signals is highly improved in the optical recording/reproducing apparatus.

In the optical scan device of the invention, a light source for emitting a light beam and an optical diffraction grating element whose grooves have the identical configuration as described above are formed so as to be relatively movable, and the optical diffraction grating element diffracts a light beam from the light source when the optical diffraction grating element moves relatively to the light source so that linear scanning operation is performed in a predetermined direction.

In the above arrangement, the light beam emitted from the light source is diffracted by the optical diffraction grating element which moves relatively to the light source, such that the recording medium is linearly scanned in a predetermined direction with the light beam. At that time, diffracted lights of substantially equal amount can be obtained from the regions of the optical diffraction grating element because the diffraction efficiencies obtained from the regions having different grating pitches are equal. The optical scan device accordingly supplies a constant amount of light beams to the area to be scanned and therefore is capable of performing accurate read/write operations.

For a fuller understanding of the nature and advantages of the invention, reference should be made to the ensuing detailed description taken in conjunction with the accompanying drawings.

BRIEF DESCRIPTION OF THE DRAWINGS

FIG. 1(a) is a schematic front diagrammatic view showing an optical diffraction grating element.

FIG. 1(b) is a section taken on line A—A in FIG. 1(a).

FIG. 1(c) is a section taken on line B—B in FIG. 1(a).

FIG. 2 is a schematic diagram showing the structure of an optical pick-up device.

FIG. 3 is a diagram showing focused light spots formed on a light receiving element.

FIG. 4 is a graph showing the relationship between the optical phase difference; and the 0th-order diffraction efficiency, first-order diffraction efficiency and optical efficiencies of the optical diffraction grating element. FIG. 4(b) shows the case where the groove tilt angle is 30°.

FIG. 5 is a graph showing the relationship among the optical efficiencies, groove tilt angle and optical phase difference in the optical grating diffraction element.

FIGS. 7 to 9 show another embodiment of the invention.

FIG. 8 is a graph showing the relationship between the optical phase difference; and the 0th-order diffraction efficiency, first-order diffraction efficiency and optical efficiencies of the optical diffraction grating element. FIG. 8(b) shows the case where the groove tilt angle is 34°.

FIG. 9 is a graph showing the relationship among the optical efficiencies, groove tilt angle and optical phase difference in the optical grating diffraction element.

FIGS. 10 to 12 show still another embodiment of the invention.

FIG. 10(a) is a schematic diagrammatic front view showing an optical diffraction grating element.

FIG. 11 is a graph showing the relationship between the optical phase difference; and the 0th-order diffraction efficiency, first-order diffraction efficiency and optical efficiencies of the optical diffraction grating element.

FIG. 12 is a graph showing the relationship among the optical efficiencies, groove tilt angle and optical phase difference in the optical grating diffraction element.

FIGS. 13 to 15 show still another embodiment of the invention.

FIG. 13 is a schematic perspective view showing the structure of an optical scan device.

FIG. 14(a) is a diagrammatic front view showing an optical diffraction grating element.

FIG. 14(b) is a section taken on line J—J in FIG. 10(a).

FIG. 15 is a schematic perspective view showing the structure of another optical scan device.

FIG. 16 is a schematic side view showing the structure of an optical pick-up device.

FIG. 17 is a diagram showing an optical diffraction grating element on which reflected light from a recording medium is incident.

FIG. 18 is a diagram showing focused light spots formed on a light receiving element.

FIG. 19 is a schematic side view showing the structure of an optical pick-up device.

FIG. 23 is a schematic perspective view showing the structure of the optical pick-up device.

DESCRIPTION OF THE EMBODIMENTS

With reference to FIGS. 1 to 4, one embodiment of the present invention will be explained below.

The optical diffraction grating element of the invention is used for the optical system of an optical pick-up device adapted to a compact disk player; video disk player; and optical recording/reproducing apparatus of both write-once type and rewritable type.

Figure 1:
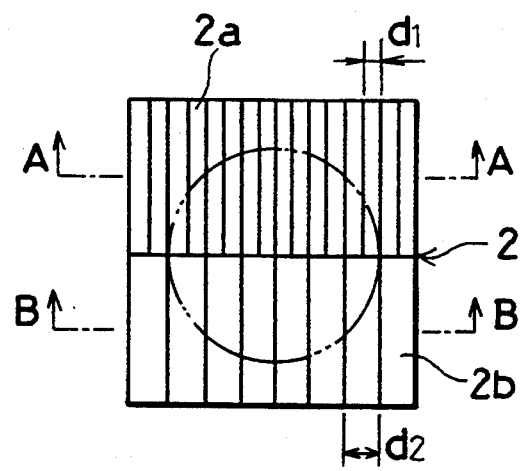
FIGS. 1 to 4 show one embodiment of the present invention.
Figure 1:
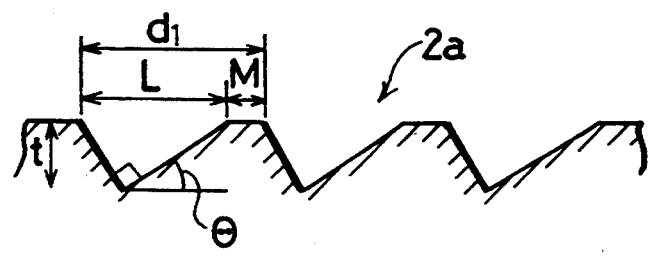
Figure 1:
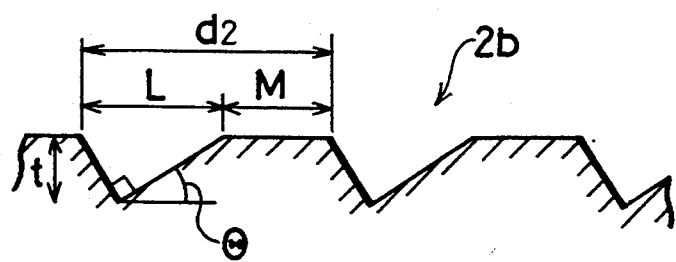
Figure 2:
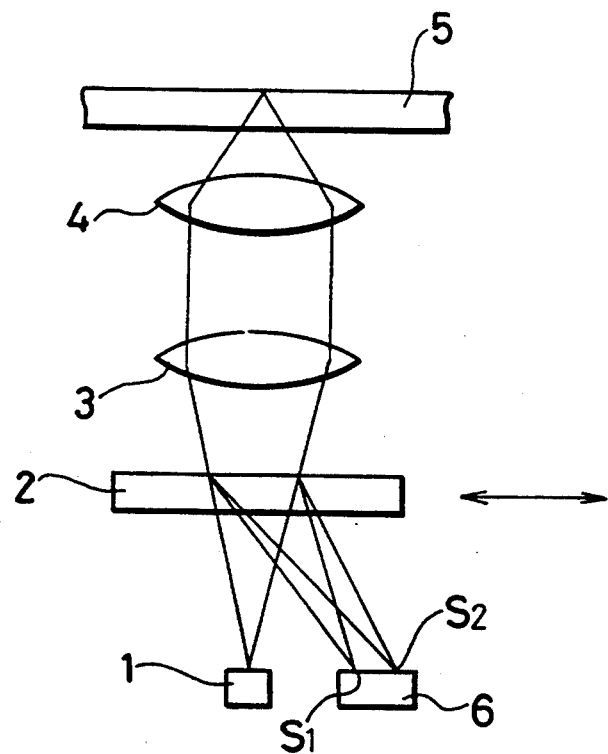

An optical pick-up device comprises, as shown in FIG. 2, a semiconductor laser 1, a collimating lens 3, an objective lens 4, an optical diffraction grating element 2 and a light receiving element 6. The semiconductor laser 1 emits a laser beam to the optical diffraction grating element 2; the collimating lens 3 converts the laser beam to a parallel beam; the objective lens 4 focuses the incident parallel beam onto the recording medium 5; the optical diffraction grating element 2 diffracts the laser beam so that the 0th-order diffracted lights of the laser beam from the semiconductor laser 1 are focused on the recording medium 5 through the collimating lens 3 and the objective lens 4 and diffracts the reflected light from the recording medium 5, which has passed through the objective lens 4 and collimating lens 3, so that the first-order diffracted lights are converged on the light receiving element 6; and the light receiving element 6 converts the incident diffracted lights into electric signals.

Figure 3:
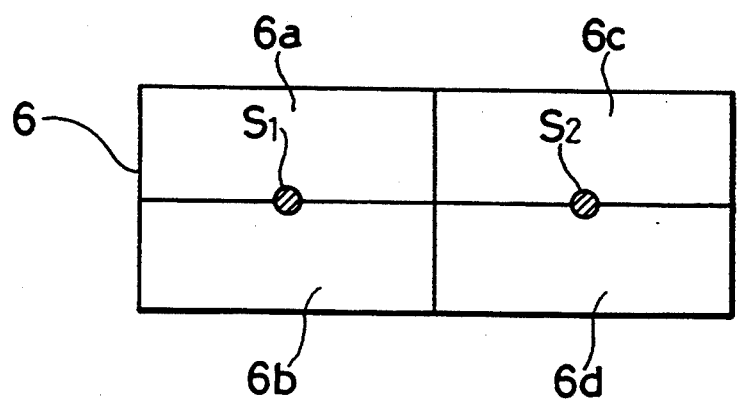

As shown in FIG. 3, the light receiving element 6 is equally divided into four rectangular light receiving sections 6a, 6b, 6c and 6d, by cross-shaped boundaries. In accordance with the received light amount, the light receiving sections 6a, 6b, 6c and 6d issue output signals sa, Sb, Sc and Sd respectively. The radial error signal RES is obtained by the following equation with Push-Pull Method: $RES=(Sa+Sb)-(Sc+Sd)$. The objective lens 4 is actuated such that the value of the radial error signal RES becomes zero, and as a result, a laser beam emitted from the semiconductor laser 1 is focused on the data recording track of the recording medium 5 with high accuracy.

Figure 16:
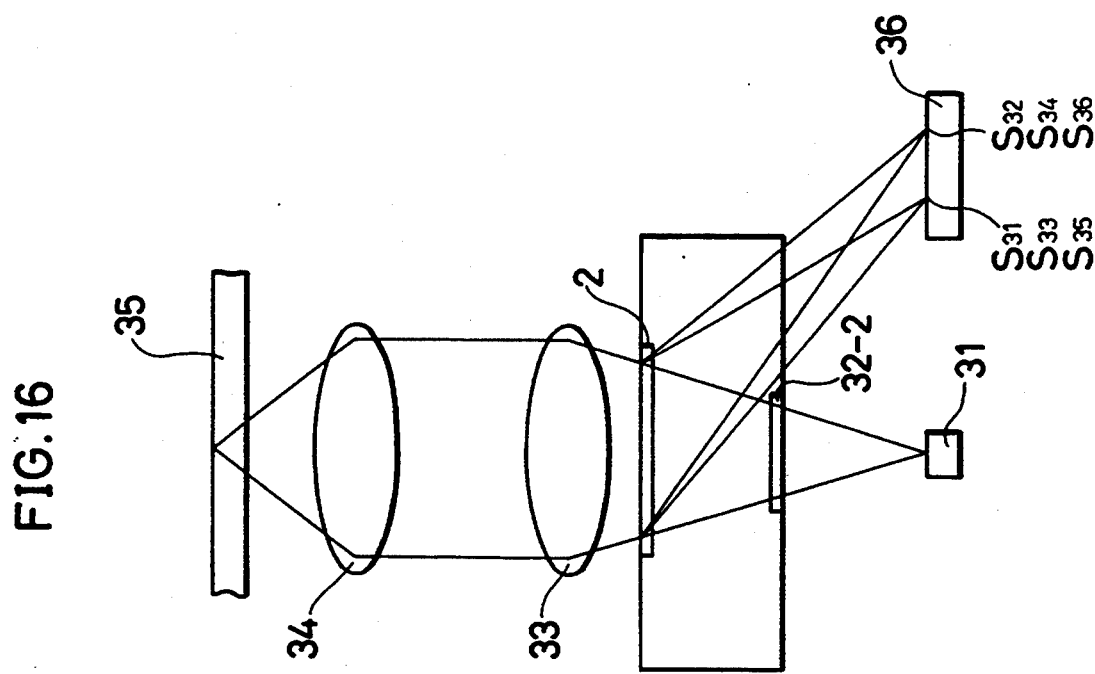
Figure 19:
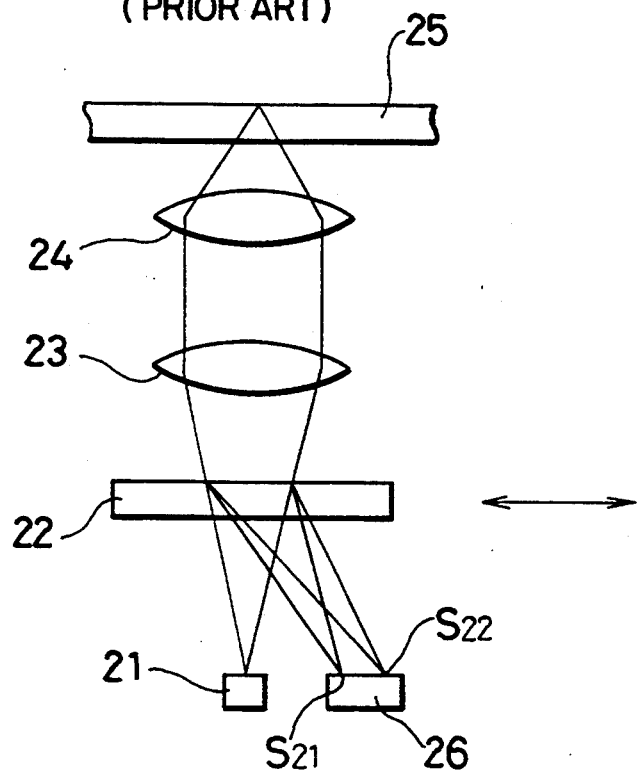
FIGS. 19 and 23 show prior art.
Figure 20:
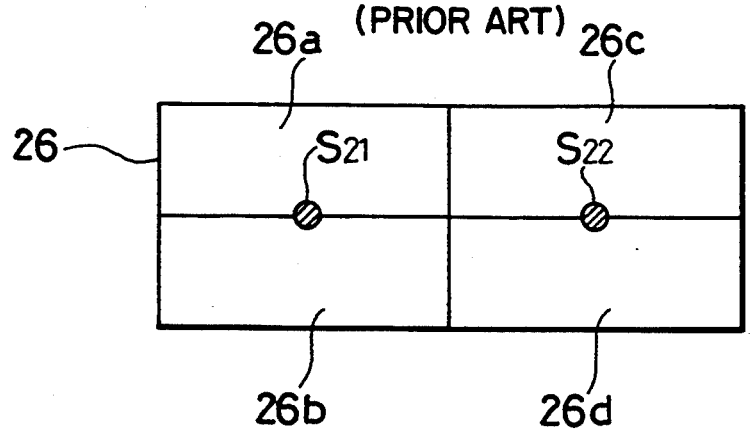
FIG. 20 is a diagram showing focused light spots formed on a light receiving element.
Figure 21A:
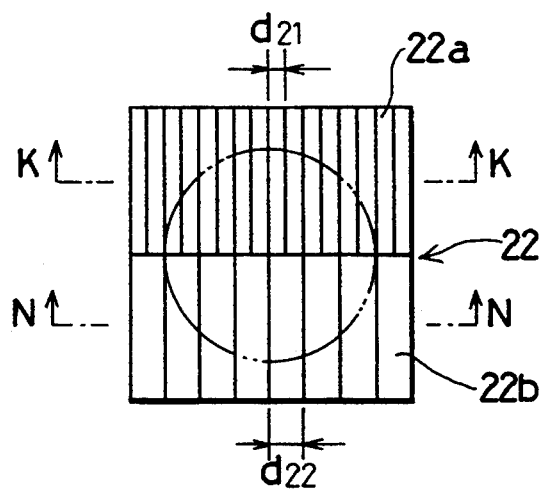
FIG. 21(a) is a schematic front view of typical examples of an optical diffraction grating element.
Figure 21B:
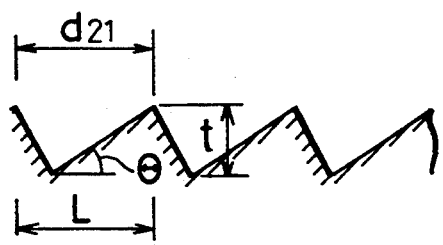
FIG. 21(b) is a section of a first example of the optical diffraction grating element, taken on line K—K in FIG. 21(a).
Figure 21C:
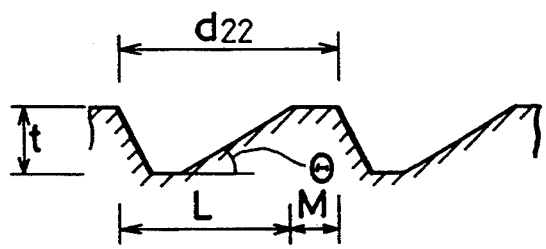
FIG. 21(c) is a section of the first example of the optical diffraction grating element, taken on line N—N in FIG. 22(a).
Figure 21D:
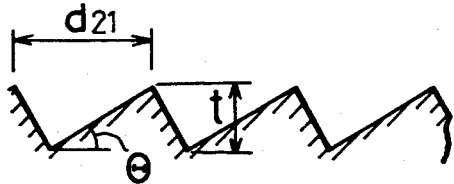
FIG. 21(d) is a section of a second example of the optical diffraction grating element, taken on line K—K in FIG. 21(a).
Figure 21E:
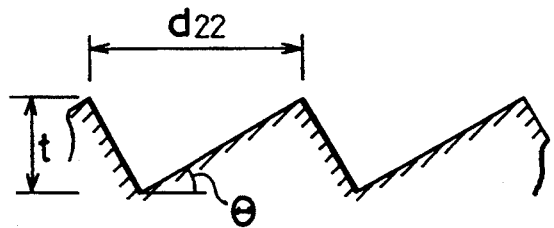
FIG. 21(e) is a section of the second example of the optical diffraction grating element, taken on line N—N in FIG. 21(a).
Figure 22A:
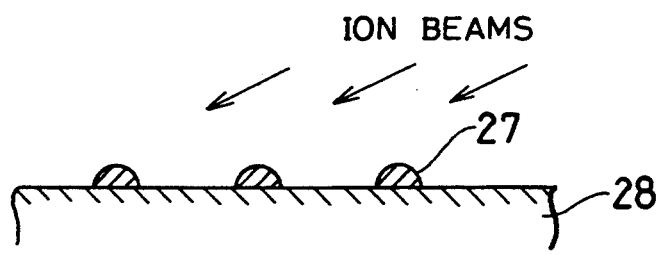
FIGS. 22(a) to 22(c) are longitudinal sections which show the etching process of a diffraction grating by ion beams made from Ar gas.
Figure 22B:
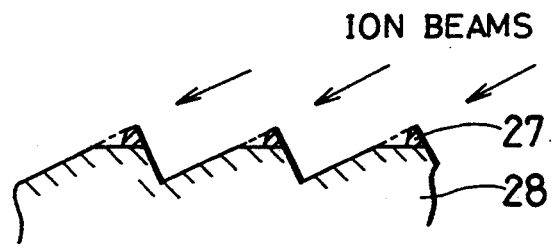
Figure 22C:
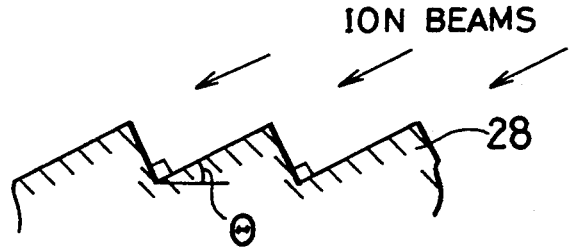
Figure 23:
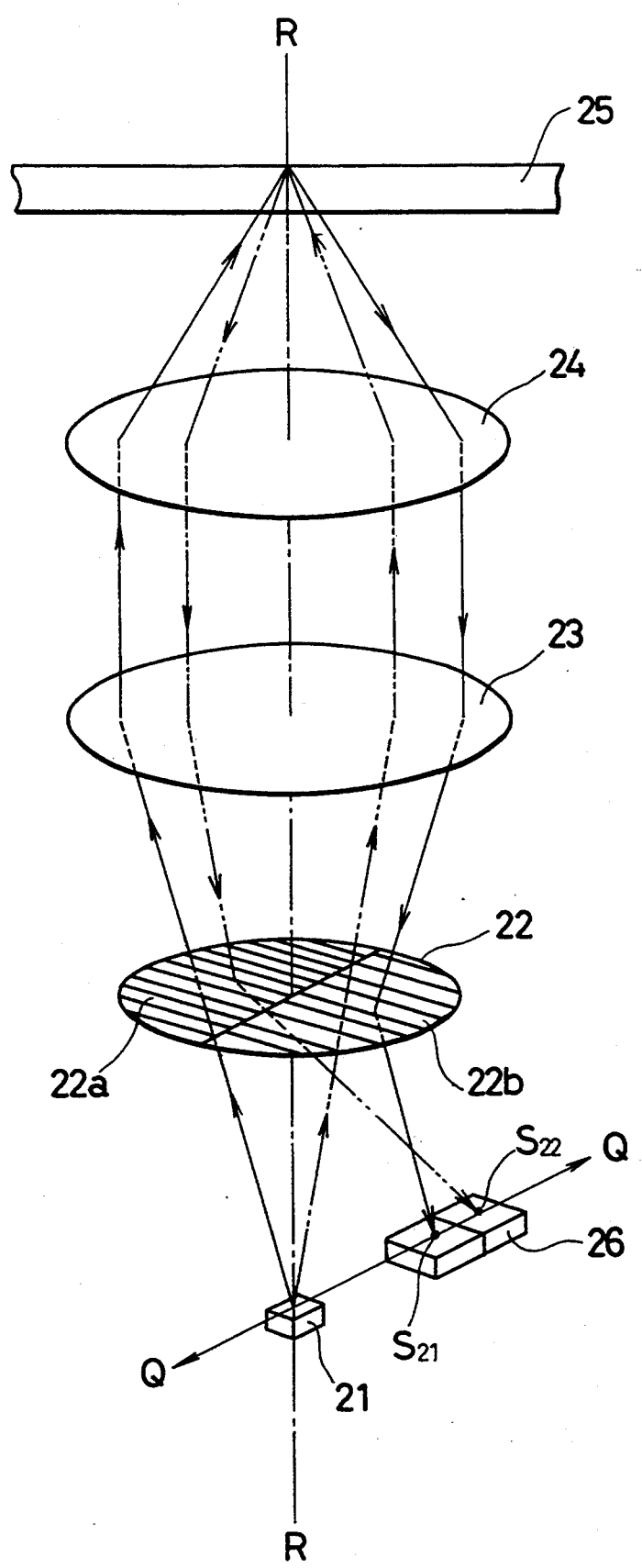
Figure 23:
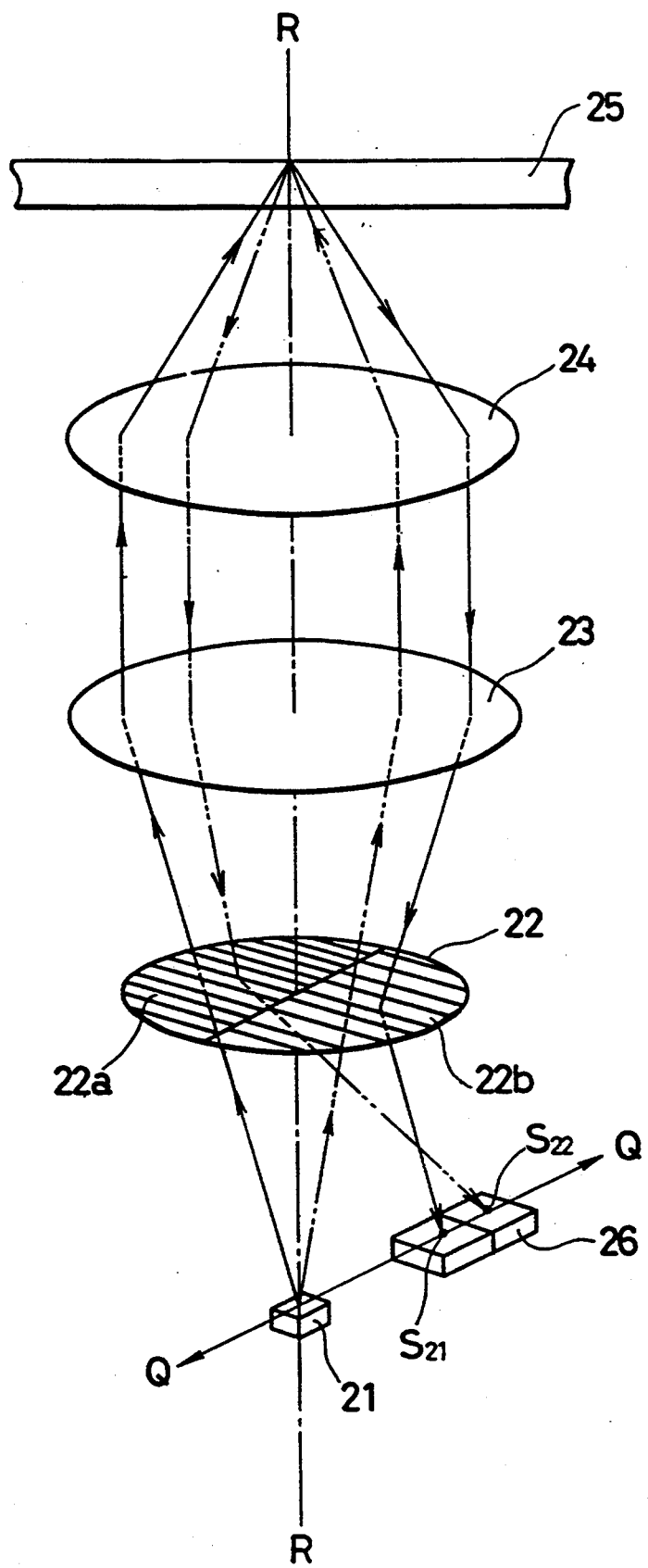

The optical diffraction grating element 2 may be used for an optical pick-up device wherein the radial error signal RES is obtained with Three Beam Method. The optical system of such an optical pick-up device comprises, as shown in FIG. 16, a semiconductor laser 31, an optical diffraction grating element 32-2, a collimating lens 33, an objective lens 34, the optical diffraction grating element 2, and a light receiving element 36. The semiconductor laser 31 emits a laser beam to the optical diffraction grating element 32-2. The optical diffraction grating element 32-2 produces sub beams and a main beam from the laser beam incident thereupon. The collimating lens 33 receives the sub beams and main beam from the optical diffraction grating element 2 to produce parallel beams and the objective lens 34 focuses the parallel beams onto a recording medium 35. The optical diffraction grating element 2 receives the sub beams and main beam reflected off of the recording medium through the objective lens 34 and collimating lens 33 to focus them onto the light receiving element 36. The light receiving element 36 is divided into five light receiving sections 36a to 36e and has a function of converting incident diffracted light into electric signals.

Figure 17:
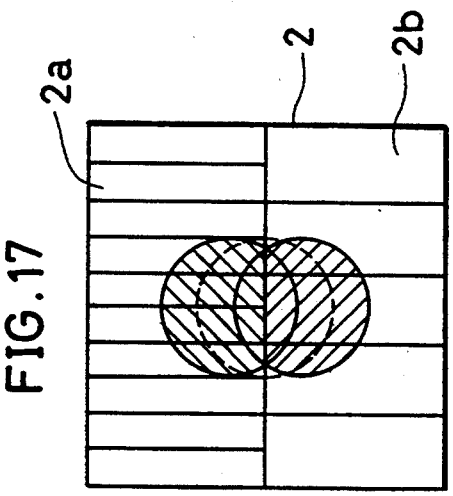
FIGS. 16 to 18 show still another embodiment of the invention.
Figure 18:
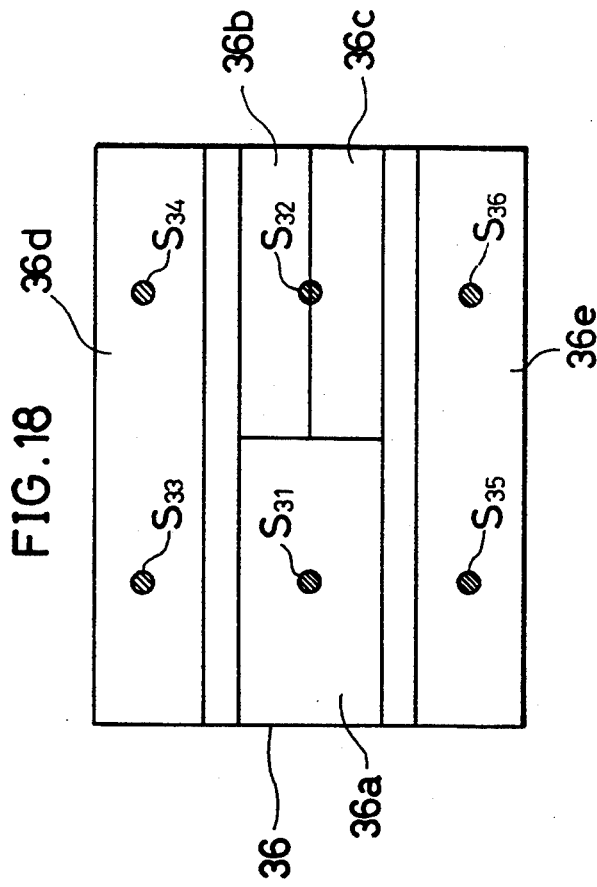

FIG. 17 shows the optical diffraction grating element 2 to which the reflected lights of the sub beams and main beam are projected back from the recording medium 35. For simplicity, the main beam is depicted by the broken line circle and the sub beams by the solid line circles in FIG. 17. As shown in FIG. 18, the reflected light of the main beam, which comes in a diffraction grating 2a is focused to form a focused light spot $S_{32}$ on the boundary of the light receiving sections 36b and 36c, while the reflected light of the main beam, which comes in a diffraction grating 2b is focused onto the light receiving section 36a to form a focused light spot $S_{31}$. The reflected lights of the sub beams, which come in the diffraction grating 2a (these reflected lights are indicated by the hatched part in FIG. 17, whose oblique lines ascend rightward) are focused onto the light receiving sections 36d and 36e to form focused light spots $S_{34}$ and $S_{36}$ respectively. On the other hand, the reflected lights of the sub beams, which come in the diffraction grating 2b (these reflected lights are indicated by the hatched part in FIG. 17, whose oblique lines ascend leftward) are focused onto the light receiving sections 36d and 36e to form focused light spots $S_{33}$ and $S_{35}$ respectively. With Three Beam Method, the radial error signal RES is obtained from the difference between the amounts of the sub beams, and calculated by: $RES=Sd'-Se'$ where Sd' and Se' represent the output signals released from the light receiving sections 36d and 36e respectively, the output signals being released in accordance with the received light amounts thereat.

The optical diffraction grating element 2 is composed of a region 2a having a first diffraction grating and a region 2b having a second diffraction grating, as shown in FIG. 1(a). The pitch $d_1$ of the first diffraction grating and the pitch $d_2$ of the second diffraction grating differ from each other ($d_1<d_2$). The reflected light of the recording medium 5 is incident on the regions 2a and 2b and diffracted thereat. The light diffracted at either of the regions 2a and 2b is converged on the boundary between the light receiving sections 6a and 6b and the light diffracted at the other region is converged on the boundary between the light receiving sections 6c and 6d.

The interfacial line of the regions 2a and 2b, and the boundary between the light receiving sections 6a and 6b (or the light receiving sections 6c and 6d), the boundary on which the emission center of the semiconductor laser 1 exists are parallel with the track direction (indicated by the arrow in FIG. 2) of the recording medium 5. The grating lines of the optical diffraction grating element 2 are approximately represented by straight lines in FIG. 1(a), but the real grating lines are gentle curved lines so that the aberration is corrected. Each of the grating pitches $d_1$ and $d_2$ is determined by the relative positions of the optical diffraction grating element 2, semiconductor laser 1 and the focal point on the light receiving element 6 and in fact, gradually varied according to the relative positions. The grating pitches $d_1$ and $d_2$ are accordingly an average value. In the case the distance between the emission center of the semiconductor laser 1 and the recording medium 5 is not equal to the distance between the focal point formed on the light receiving element 6 and the recording medium 5, it is required to give the functions of a lens to the optical diffraction grating element 2 and the grating configuration thereof is also determined by the relative positions of the optical diffraction grating element 2, semiconductor laser 1 and the focal point formed on the light receiving element 6.

In the case the optical diffraction grating element 2 is etched by ion beams made from Ar gas for example, the sections of the regions 2a and 2b have, as shown in FIGS. 1(b) and 1(c), a teeth-saw-configuration which possesses a high diffraction grating efficiency. This teeth-saw-configuration of the regions 2a and 2b is arranged such that unsymmetrical v-shaped grooves and flat lands are successively alternately formed. Each groove is made up of a short inclined surface and long inclined surface and these two inclined surfaces make a substantially right angle, forming the bottom portion of the groove. The grating pitches $d_1$ and $d_2$ are respectively equal to the sum of the groove width L and land width M. The important feature of the invention lies in the fact that the groove width L, groove depth t, and groove tilt angle $\Theta$ (i.e, the tilt angle of the inclined surface of the groove with respect to the plane which intersects the bottom of the groove and is parallel with the land surface) are made constant irrespective of the grating pitches $d_1$ and $d_2$. Therefore, the grating pitches $d_1$ and $d_2$ are respectively varied according to the land width M. In other words, the land width M of the region 2b is wider than that of the region 2a by the difference between the grating pitches $d_1$ and $d_2$.

The object in employing the same sectional configuration for the regions 2a and 2b is to obtain the same 0th-order diffraction efficiency and first-order diffraction efficiency from the regions 2a and 2b having different pitches. If the optical diffraction grating element 2 having the above arrangement is used for the optical system of an optical pick-up device provided in an optical recording/reproducing apparatus, a laser beam emitted from the semiconductor laser 1 is focused on the data recording track of the recording medium 5 with high accuracy and the S/N ratio is improved in output signals released from the optical pick-up device.

The following description concretely discusses the preferable ranges of the groove tilt angle $\Theta$ and groove depth t in accordance with which the optical phase difference between the incident light and outgoing light is determined.

Suppose the average grating pitch $d_1$ in the region 2a shown in FIG. 1(a) is $(2.2\pm0.2)\alpha$ and the average grating pitch $d_2$ in the region 2b is $(2.8\pm0.2)\alpha$ where $\alpha$ represents the wavelength of light incident on the optical diffraction grating element 2. In the above case, the allowable range of the optical phase difference is $0.7\eta$ to $0.9\eta$. The optical phase difference is obtained by: $\delta\phi=2\eta t(n-1)/\alpha$ where $\delta\phi$ represents the optical phase difference; n represents the refractive index of the substrate of the optical diffraction grating element 2; t represents the groove depth and $\alpha$ represents the wavelength of the incident light. The allowable range of the groove tilt angle $\Theta$ is 30° to 45° for the groove depth t which is obtained from the above equation when the optical diffraction grating element 2 is made of silica glass having a refractive index (n) of 1.454 and the wavelength of the incident light ($\alpha$) is 780 nm. In other words, when the groove depth t is obtained by the following equation (converted from the above equation): $t=\delta\phi\times\alpha/2\eta(n-1)$, substituting numerical values $\delta\phi=0.7\eta$ to $0.9\eta$, $\alpha=0.78$, and $n=1.454$, the allowable range of the groove tilt angle $\Theta$ is 30° to 45°. The groove tilt angle $\Theta$ and groove depth t are determined on condition that the above allowable ranges of the optical phase difference and groove tilt angle are satisfied; the 0th-order diffraction efficiency $E_{10}$ at the region 2a is substantially equal to the 0th-order diffraction efficiency $E_{20}$ at the region 2b; and the first-order diffraction efficiency $E_{11}$ at the region 2a is substantially equal to the first-order diffraction efficiency $E_{21}$ at the region 2b. In this case, the 0th-order diffraction efficiencies may deviate from each other within an allowable tolerance of $\pm5\%$ and so may the first-order diffraction efficiencies.

Optical efficiencies obtained from the above arrangement show a high value, i.e., 12% or more: one of the optical efficiencies is obtained by the product of the 0th-order diffraction efficiency $E_{10}$ in the region 2a having the grating pitch $d_1$ and the first diffraction efficiency $E_{21}$ in the region 2b having the grating pitch $d_2$ (the optical efficiency thus obtained is represented by $E_{1021}$); and the other is obtained by the product of the 0th-order diffraction efficiency $E_{20}$ in the region 2b and the first-order diffraction efficiency $E_{11}$ in the region 2a (the optical efficiency thus obtained is represented by $E_{1120}$). These optical efficiencies $E_{1021}$ and $E_{1120}$ fundamentally influences the amounts of light incident on the light receiving element 6. The optimum values of the grating pitches $d_1$ and $d_2$ are respectively in the range of $2.2\alpha$ to $2.8\alpha$ having a tolerance of $\pm0.2\ \alpha$, and the optical efficiencies $E_{1021}$ and $E_{1120}$ are 12% or more in this condition. The wavelength $\alpha$ of the laser beam emitted from the semiconductor laser 1 in this invention is generally the oscillation wavelength of a semiconductor laser widely known as a light source for an optical pick-up device, and is e.g. 780 nm.

It is most preferable to set the optical grating efficiencies $E_{1021}$ and $E_{1120}$ to 12% or more in the case the optical diffraction grating element 2 is provided in an optical pick-up device in a video signal recording/reproducing apparatus for example. More specifically, in an optical pick-up device in which video signals are used, at least 45 dB of S/N ratio is required for the output signals in order to obtain high quality video signals. To obtain the above S/N ratio, the optical efficiencies $E_{1021}$ and $E_{1120}$ of the optical diffraction grating element 2 is preferably 12% or more.

In order to determine the optimum groove tilt angle $\Theta$ and optical phase difference, the groove tilt angle $\Theta$ was varied, and meanwhile the relation was observed among an optical phase difference caused depending on the groove depth t; the 0th-order diffraction efficiencies $E_{10}$ and $E_{20}$ in the regions 2a and 2b; the first-order diffraction efficiencies $E_{11}$ and $E_{21}$ in the regions 2a and 2b; and optical efficiencies $E_{1021}$ and $E_{1120}$. The results are shown in the following description. In the graph of FIG. 4, the diffraction efficiency obtained when the groove depth (optical phase difference) is the calculated maximum value with the grating pitches $d_1$ and $d_2$ is plotted, for convenience, for the diffraction efficiency obtained when the groove depth is beyond the calculated maximum value.

Figure 4A:
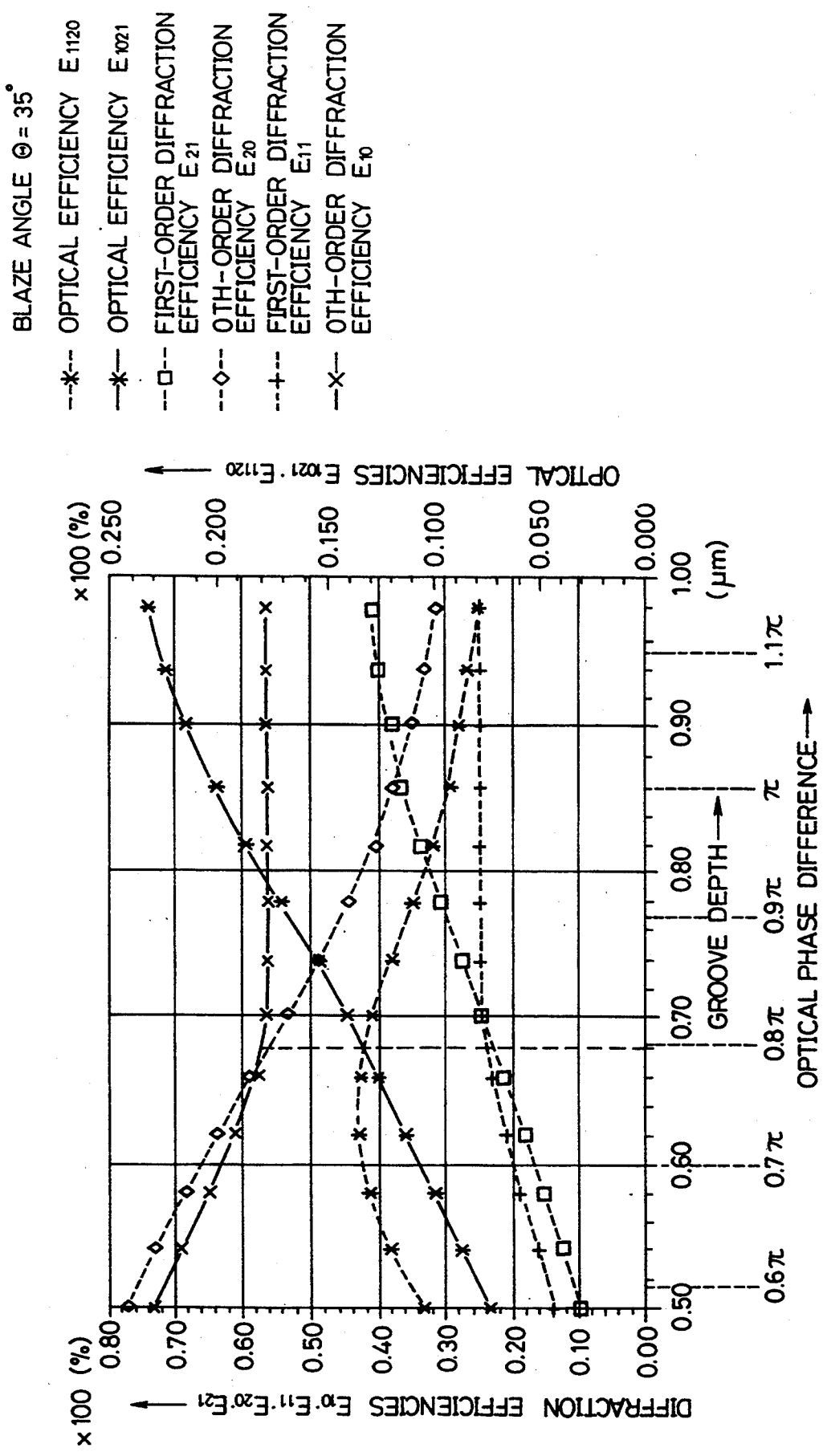
FIG. 4(a) shows the case where the groove tilt angle is 35°.
Figure 4:
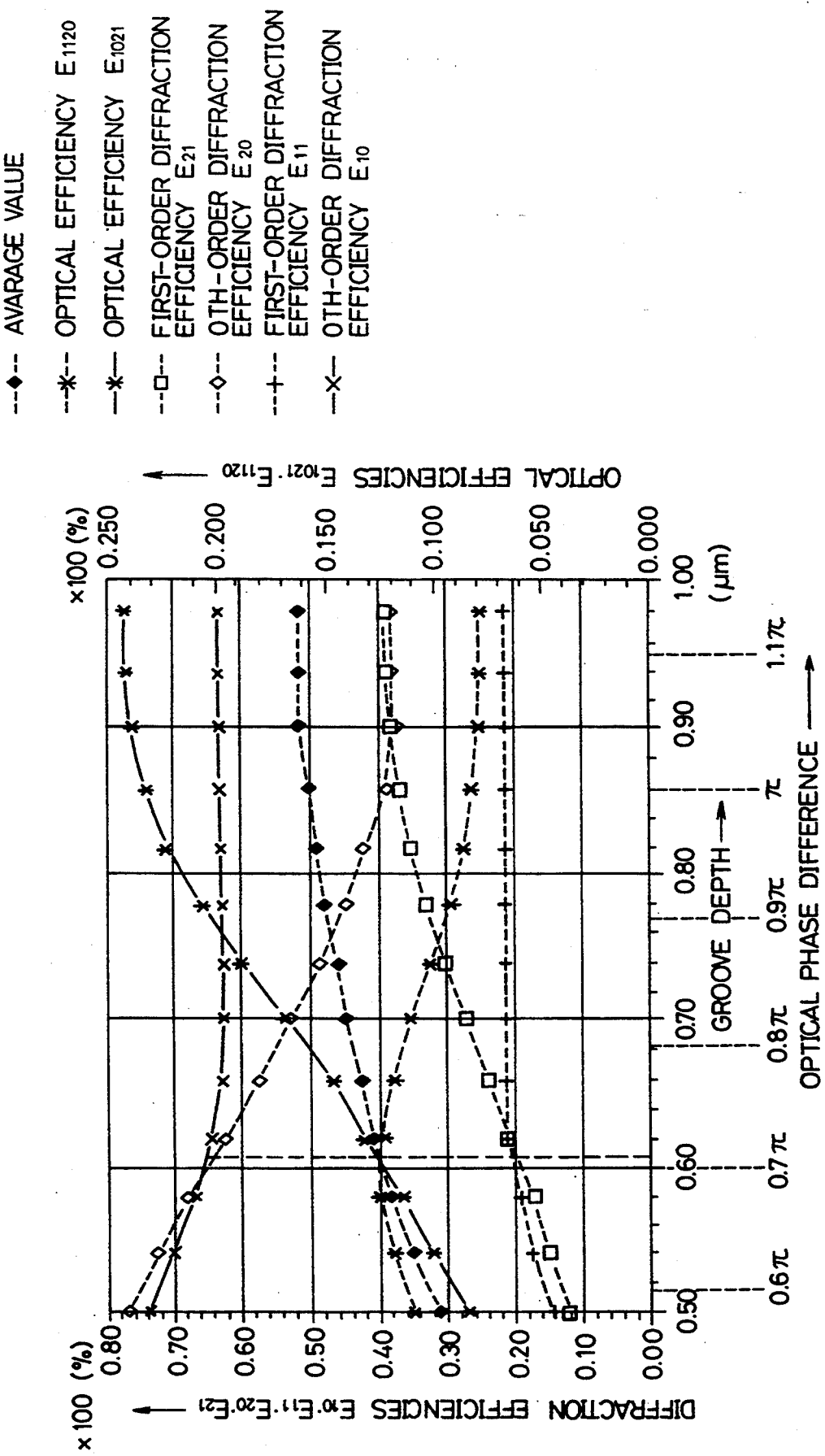

The graph of FIG. 4(a) shows the dependence of the diffraction efficiencies on the groove depth t of the optical diffraction grating element 2 made of silica glass having e.g. a refractive index of 1.454. In the case the groove tilt angle $\Theta$ was 35°, when the groove depth t was in the vicinity of 0.68 μm (this groove depth causes an optical phase difference of approximately $0.79\eta$), the 0th-order diffraction efficiency $E_{10}$ in the region 2a was substantially equal to the 0th-order diffraction efficiency $E_{20}$ in the region 2b, the first-order diffraction efficiency $E_{11}$ in the region 2a was substantially equal to the first-order diffraction efficiency $E_{21}$ in the region 2b, and both optical efficiencies $E_{1021}$ and $E_{1120}$ of the optical diffraction grating element 2 were about 13.1%.

In the case the groove tilt angle $\Theta$ was the lower limit of the above-mentioned allowable range (30° to 45°), that is, $\Theta=30°$, when the groove depth t was 0.61 μm and the optical phase difference was 0.71η, the 0th-order diffraction efficiencies $E_{10}$ and $E_{20}$ became substantially equal, the first diffraction efficiencies $E_{11}$ and $E_{21}$ became substantially equal, and the optical efficiencies $E_{1021}$ and $E_{1120}$ became 12% or more, as shown in the graph in FIG. 4(b).

Figure 4C:
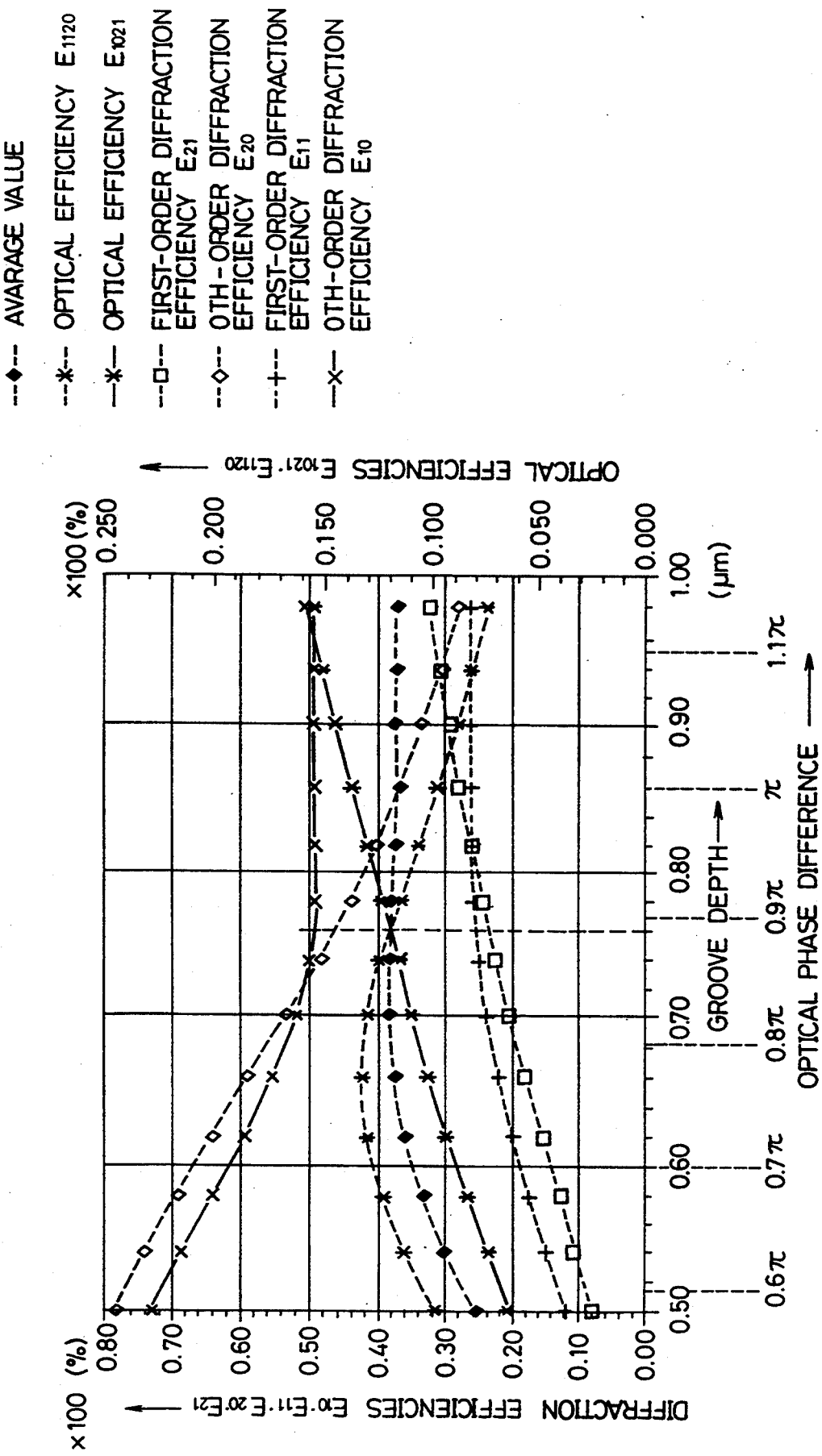
FIG. 4(c) shows the case where the groove tilt angle is 45°.

In the case the groove tilt angle $\Theta$ was the upper limit of the allowable range that is $\Theta=45°$, when the groove depth was 0.76 μm and the optical phase difference was 0.88η, the 0th-order diffraction efficiencies $E_{10}$ and $E_{20}$ became substantially equal, the first diffraction efficiencies $E_{11}$ and $E_{21}$ became substantially equal, and the optical efficiencies $E_{1021}$ and $E_{1120}$ became 12% or more, as shown in the graph in FIG. 4(c).

Figure 4D:
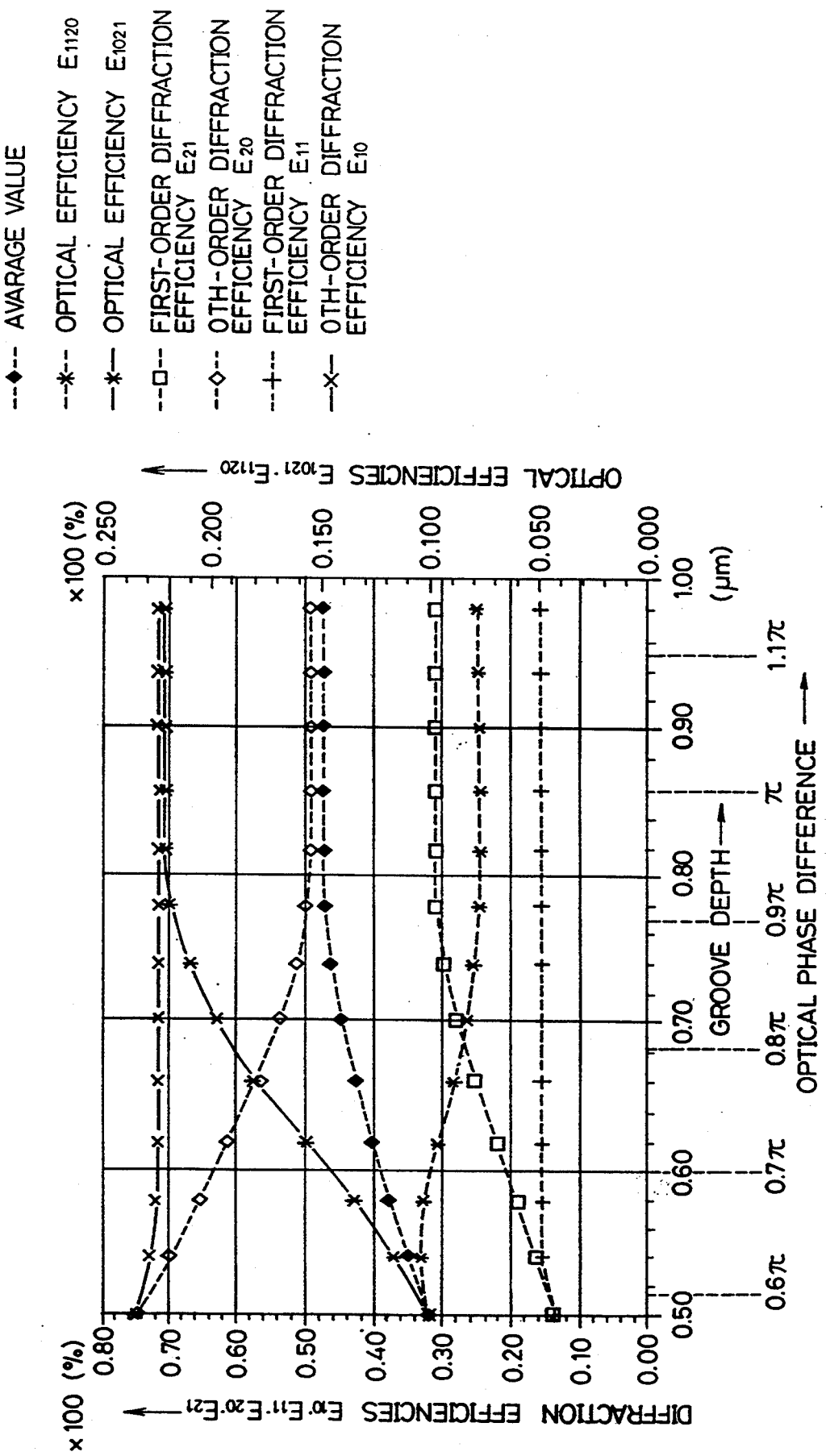
FIG. 4(d) shows the case where the groove tilt angle is 25° and FIG. 4(e) shows the case where the groove tilt angle is 50°.

In the case the groove tilt angle $\Theta$ was smaller than the allowable range e.g. $\Theta=25°$, the 0th-order diffraction efficiencies $E_{10}$ and $E_{20}$ became substantially equal, and the first diffraction efficiencies $E_{11}$ and $E_{21}$ became substantially equal, when the groove depth t was 0.50 μm and the optical phase difference was 0.58η as shown in FIG. 4(d). At that time, the optical efficiencies $E_{1021}$ and $E_{1120}$, however, became about 10% which was below the optimum value (12%).

Figure 4E:
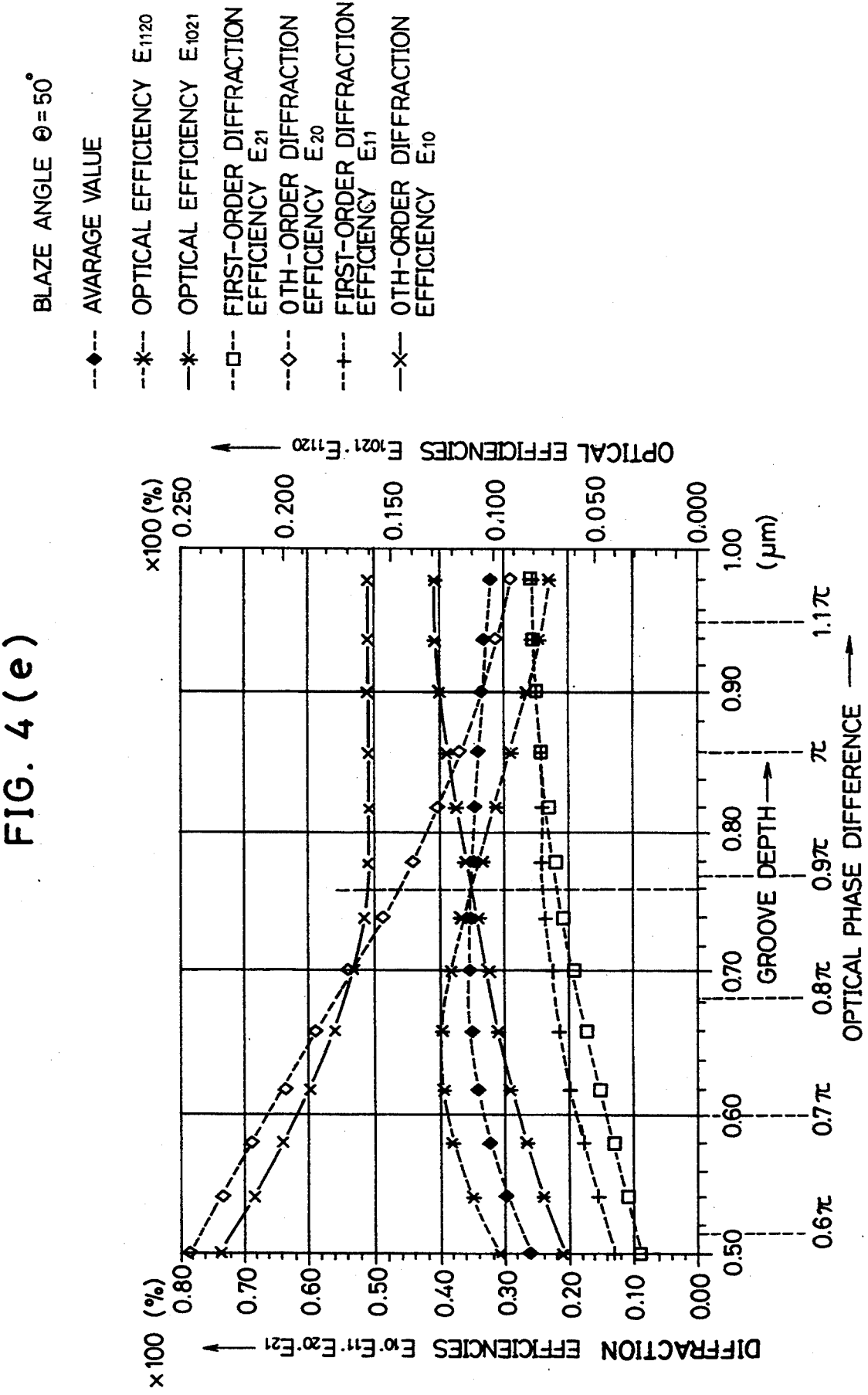

In the case the groove tilt angle $\Theta$ was above the allowable range, e.g. $\Theta=50°$, the 0th-order diffraction efficiencies $E_{10}$ and $E_{20}$ became substantially equal, and the first diffraction efficiencies $E_{11}$ and $E_{21}$ became substantially equal, when the groove depth t was 0.76 μm and the optical phase difference was 0.88η as shown in FIG. 4(e). The optical efficiencies $E_{1021}$ and $E_{1120}$, however, became about 11% which was below the optimum value (12%) like the above case.

When the relation among the optical efficiencies $E_{1021}$ and $E_{1120}$, groove tilt angle $\Theta$ and optical phase difference are analyzed from the above cases, the results shown in the graph of FIG. 5 are obtained. As apparent from FIG. 5, the optical efficiencies $E_{1021}$ and $E_{1120}$ of the optical diffraction grating element 2 are 12% or more on condition that the optical phase difference caused depending on the groove depth t is in the range of 0.7η to 0.9η. At that time, the groove tilt angle $\Theta$ is in the range of 30° to 45°. The most preferable higher values of the optical efficiencies $E_{1021}$ and $E_{1120}$ are obtained on condition that the optical phase difference is in the range of 0.77η to 0.85η. At that time, the groove tilt angle $\Theta$ is in the range of 34° to 40°.

In the above arrangement, a laser beam having a wavelength of 780 nm which is emitted from the semiconductor laser 1 is incident on the optical diffraction grating element 2. Of the lights diffracted at the regions 2a and 2b of the optical diffraction grating element 2, the 0th-order diffracted lights impinge upon the collimating lens 3 to produce parallel light which is focused on the data recording track of the recording medium 5 by the objective lens 4. At that time, the laser beam is accurately focused on the recording track of the recording medium 5 since the 0th-order diffraction efficiencies $E_{10}$ and $E_{20}$ in the regions 2a and 2b are equal. A light reflected off of the recording medium 5 returns to the optical diffraction grating element 2 after passing through the objective lens 4 and collimating lens 3. Of the lights diffracted at the regions 2a and 2b, the first-order diffracted lights are respectively focused on the light receiving element 6. The laser beam which has passed through one region (e.g. the region 2a) of the optical diffraction grating element 2 in the forward path is projected back to the other region (e.g. the region 2b) of the optical diffraction grating element 2 after being reflected at the recording medium 5. On the other hand, the laser beam which has passed through the other region (the region 2b) in the forward path is reflected at the recording medium 5 to be incident on the region 2a. The light incident on the region 2a having a relatively smaller grating pitch $d_1$ is focused to form a focused light spot $S_2$ on the boundary between the light receiving sections 6c and 6d of the light receiving element 6, while the light incident on the region 2b having a relatively larger grating pitch $d_2$ is focused to form a focused light spot $S_1$ on the boundary between the light receiving sections 6a and 6b.

At that time, the light amounts of the focused light spots $S_1$ and $S_2$ formed on the light receiving element 6 become equal since the optical efficiencies $E_{1021}$ and $E_{1120}$ are set to be equal. Hence, when the focal point of the objective lens 4 is positioned on the data recording track of the recording medium 5, the radial error signal RES calculated by the equation RES=-(Sa+Sb)−(Sc+SD) becomes zero. In case the focal point is shifted from the data recording track, the radial error signal RES corresponds to the amount of the dislocation and thereby the dislocation is precisely corrected. This arrangement enables a highly accurate tracking control.

Further, since the optical efficiencies $E_{1021}$ and $E_{1120}$ are both 12% or more, signal noise is reduced and high-quality video signals with a S/N ratio of at least 45 dB is easily obtained when the optical diffraction grating element 2 is adapted to a video signal recording/reproducing apparatus. Also, when the optical diffraction grating element 2 is used for the optical system of an optical pick-up adapted to a compact disk player or the like, other members of the pick-up device are not overloaded. As a result, high quality read-out signals can be produced without increasing the production cost.

Figure 6A:
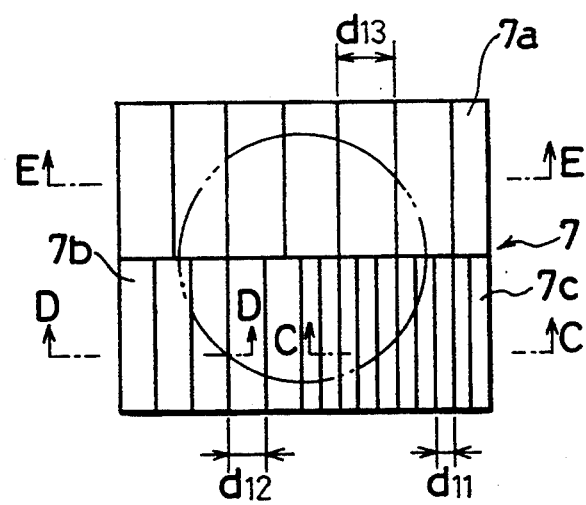
FIG. 6(a) is a schematic diagrammatic front view showing another optical diffraction grating element.
Figure 6B:
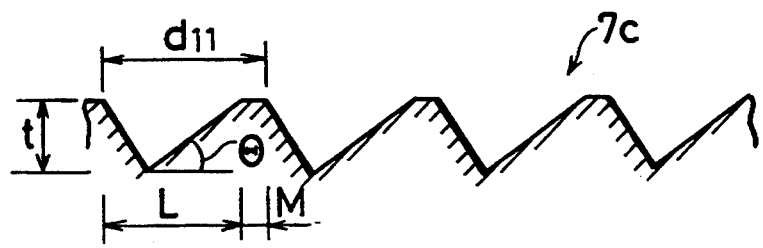
FIG. 6(b) is a section taken on line C—C in FIG. 4(a).
Figure 6C:
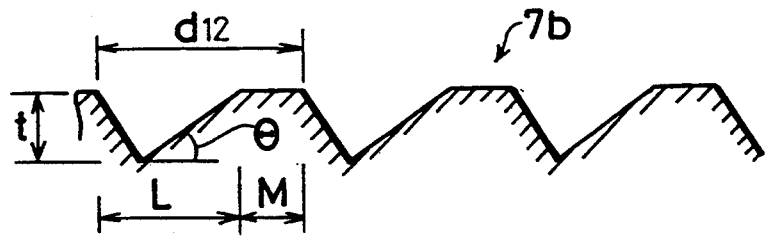
FIG. 6(c) is a section taken on line D—D in FIG. 4(a).
Figure 6D:
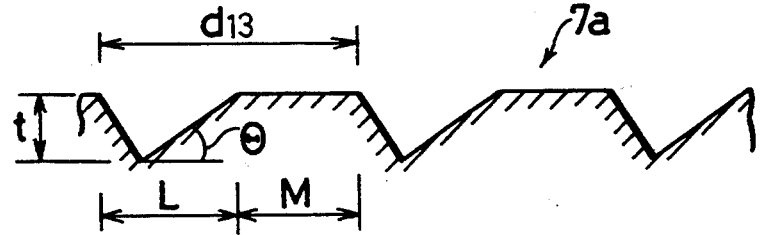
FIG. 6(d) is a section taken on line E—E in FIG. 4(a).

The foregoing arrangement is suitable for fabricating an optical diffraction grating element comprising at least two different pitched regions each including a diffraction grating which has a teeth-saw-configuration in section, wherein the amounts of lights diffracted at the regions are equal to each other. For example, in an optical diffraction grating element 7 as shown in FIG. 6(a), wherein three regions 7a, 7b and 7c having different grating pitches $d_{11}$, $d_{12}$ and $d_{13}$ are formed and gratings formed in the regions 7a, 7b and 7c respectively have a teeth-saw-configuration in section, those gratings have the same sectional configuration (see FIGS. 6(b), 6(c) and 6(d)), i.e., the same groove width L, groove depth t and groove tilt angle $\Theta$, while the differences among the grating pitches $d_{11}$, $d_{12}$ and $d_{13}$ are determined by the differences among the land widths M.

Figure 7A:
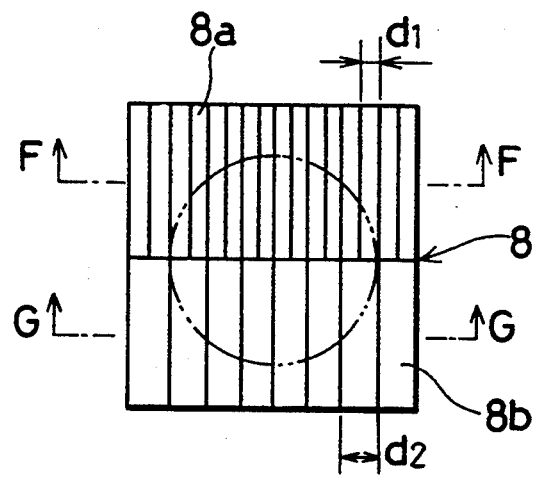
FIG. 7(a) is a schematic diagrammatic front view showing an optical diffraction grating element.

Now, reference will be made to FIGS. 7 to 9 for explaining another embodiment of the invention. As shown in FIG. 7(a), an optical diffraction grating element 8 according to the invention is comprised of two regions 8a and 8b which include first and second diffraction gratings respectively. The first and second diffraction gratings have different grating pitches $d_1$ and $d_2$ like the optical diffraction grating element 2 in the foregoing embodiment. When the optical diffraction grating element is etched by ion beams made from e.g.

Figure 7B:
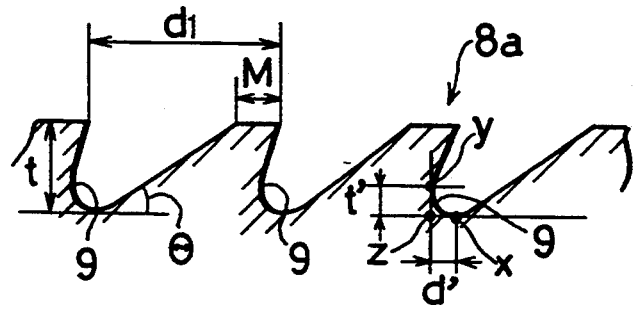
FIG. 7(b) is a section taken on line F—F in FIG. 7(a).
Figure 7C:
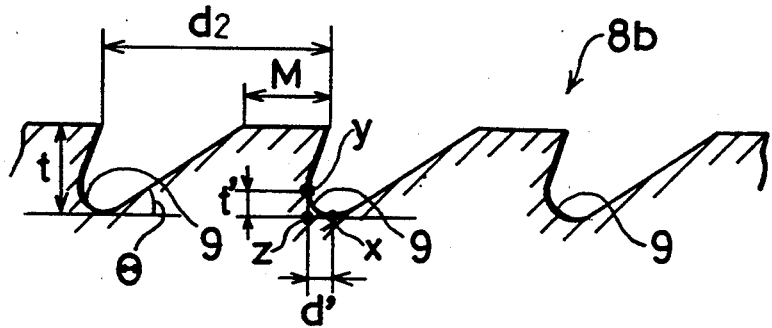
FIG. 7(c) is a section taken on line G—G in FIG. 7(a).

CHF$_3$ gas, grooves and flat lands positioned between the adjacent grooves are successively formed as shown in FIGS. 7(b) and 7(c) which show the sectional configurations of the regions 8a and 8b respectively. These configurations possess a high diffraction efficiency. Each groove is made up of an inclined surface having a groove tilt angle Θ and a curved surface 9 having a high curvature. The tangent point of the curved surface 9 and a horizontal line is represented by x; the tangent point of the curved surface 9 and a vertical line is represented by y; and the intersection of the above horizontal line and vertical line is represented by z. The distance t' between the tangent point y and intersection z and the distance d' between the tangent point x and intersection z are constants which define the configuration of the curved surface 9. When the optical diffraction grating element 8 is etched by ion beams made from CHF$_3$ gas, the distance d' in the regions 8a and 8b are about 10–20% of the grating pitches d$_1$ and d$_2$ respectively, while the distance t' is about 40–60% of the groove depth t. Like the optical diffraction grating element 2 in the first embodiment, it is an essential characteristic for the optical diffraction grating element 8 that the gratings in the regions 8a and 8b are identical in the groove depth t and groove tilt angle Θ. The difference between the grating pitches of the two regions is varied in accordance with the land width M. In other words, the land width M of the region 8b is wider than that of the region 8a by the difference between the grating pitches d$_1$ and d$_2$ of the two regions. The sectional configurations of the grooves in the regions 8a and 8b are designed to be identical for the purpose of equalizing the 0th-order diffraction efficiencies in the regions 8a and 8b whose grating pitches are different, as well as equalizing the first-order diffraction efficiencies in the regions 8a and 8b.

The following description discusses a preferable condition for the optical diffraction grating element 8 having the above curved surface 9.

Suppose the average of the grating pitch d$_1$ is $(2.2\pm0.2)\alpha$ and the average of the grating pitch d$_2$ is $(2.8\pm0.2)\alpha$ in the optical diffraction grating element 8, where $\alpha$ represents the wavelength of the incident light. In this case, the optical phase difference is in the range of $0.7\eta$ to $1.1\eta$ and the groove tilt angle Θ is in the range of 34° to 42° when $\alpha=780$ nm and $n=1.454$. The groove tilt angle Θ and groove depth t are determined in such a way that the above requirements are satisfied; and the 0th-order diffraction efficiency E$_{10}$ and first-order diffraction efficiency E$_{11}$ in the region 8a are substantially equal to the 0th-order diffraction efficiency E$_{20}$ and first-order diffraction efficiency E$_{21}$ in the region 8b respectively. In this case, the 0th-order diffraction efficiencies may deviate from each other within an allowable tolerance of ±5% and so may the first-order diffraction efficiencies. Compared with the optical diffraction grating element 2, in the optical diffraction grating element 8, the allowable range of the groove tilt angle Θ is narrower due to the curved surface 9 while the allowable range of the groove depth t (i.e. the allowable range of the optical phase difference) is wider since the upper limit is extended.

In order to determine the optimum groove tilt angle Θ and groove depth t, the groove tilt angle Θ was varied and meanwhile the relation was observed among the optical phase difference caused depending on the groove depth t; the 0th-order diffraction efficiencies E$_{10}$ and E$_{20}$ in the regions 8a and 8b; the first-order diffraction efficiencies E$_{11}$ and E$_{21}$ in the regions 8a and 8b; and optical efficiencies E$_{1021}$ and E$_{1120}$ of the optical diffraction grating element 8. The following description describes the above results. In the graph of FIG. 8, the diffraction efficiency obtained when the groove depth (optical phase difference) is the calculated maximum value with the grating pitches d$_1$ and d$_2$ is plotted, for convenience, for the diffraction efficiency obtained when the groove depth is beyond the calculated maximum value.

Figure 8A:
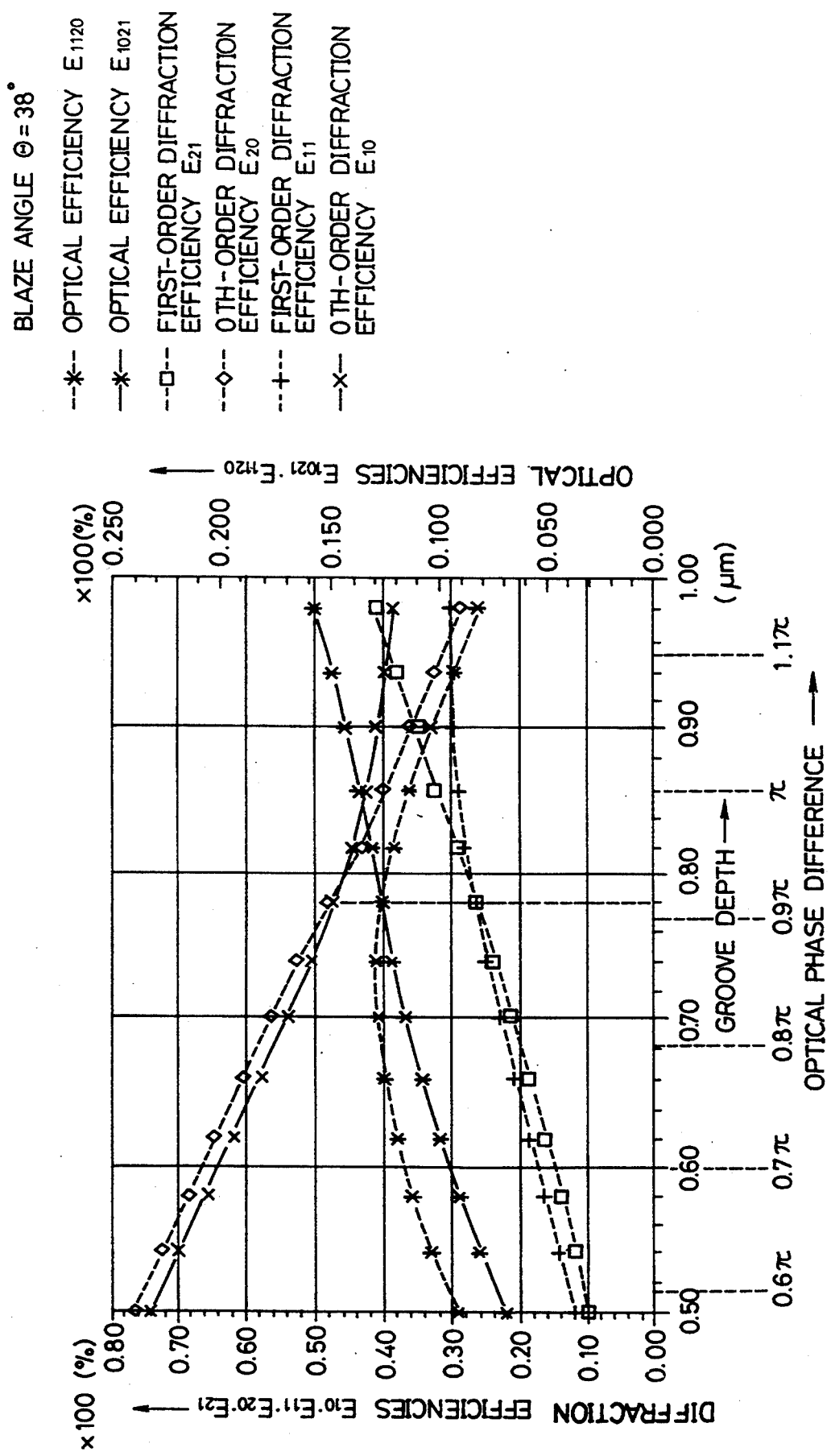
FIG. 8(a) shows the case where the groove tilt angle is 38°.

The graph of FIG. 8(a) shows the dependence of the diffraction efficiencies on the groove depth t of the optical diffraction grating element 8 made of silica glass having a refractive index of 1.454. In the case the groove tilt angle Θ=38°, when the groove depth t was in the vicinity of 0.78 μm (this groove depth t causes an optical phase difference of approximately $0.91\eta$), the 0th-order diffraction efficiency E$_{10}$ in the region 8a was substantially equal to the 0th-order diffraction efficiency E$_{20}$ in the region 8b, the first diffraction efficiency E$_{11}$ in the region 8a was substantially equal to the first diffraction efficiency E$_{21}$ in the region 8b, and both optical efficiencies E$_{1021}$ and E$_{1120}$ of the optical diffraction grating element 8 are about 12.7%.

When the optical diffraction grating element 8 is used for e.g. a video signal recording/reproducing apparatus, desired high quality video signals can be obtained with the optical efficiencies of 12% or more, similarly to the optical diffraction grating element 2.

In the case the groove tilt angle Θ was the lower limit of the above-mentioned allowable range (34° to 42°), that is, Θ=34°, when the groove depth t was 0.66 μm and the optical phase difference was $0.77\eta$, the 0th-order diffraction efficiencies E$_{10}$ and E$_{20}$ became substantially equal, the first diffraction efficiencies E$_{11}$ and E$_{21}$ became substantially equal, and the optical efficiencies E$_{1021}$ and E$_{1120}$ became 12% or more as shown in the graph of FIG. 8(b).

Figure 8C:
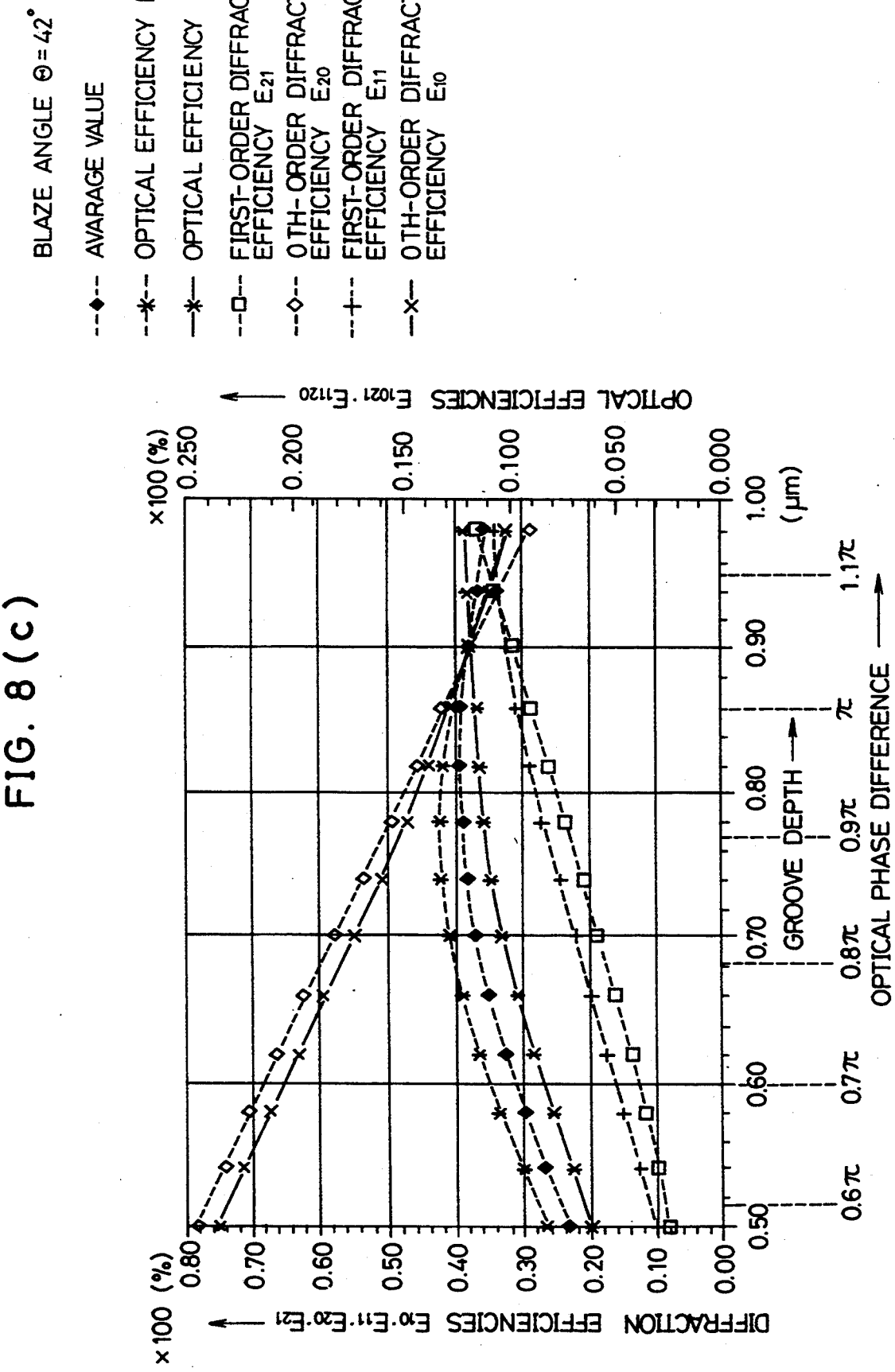
FIG. 8(c) shows the case where the groove tilt angle is 42°.

In the case the groove tilt angle Θ was the upper limit of the allowable range, that is, Θ=42°, when the groove depth was 0.90 μm and the optical phase difference was $1.05\eta$, the 0th-order diffraction efficiencies E$_{10}$ and E$_{20}$ became substantially equal, the first diffraction efficiencies E$_{11}$ and E$_{21}$ became substantially equal, and the optical efficiencies E$_{1021}$ and E$_{1120}$ became 12% or more as shown in the graph of FIG. 8(c).

Figure 8D:
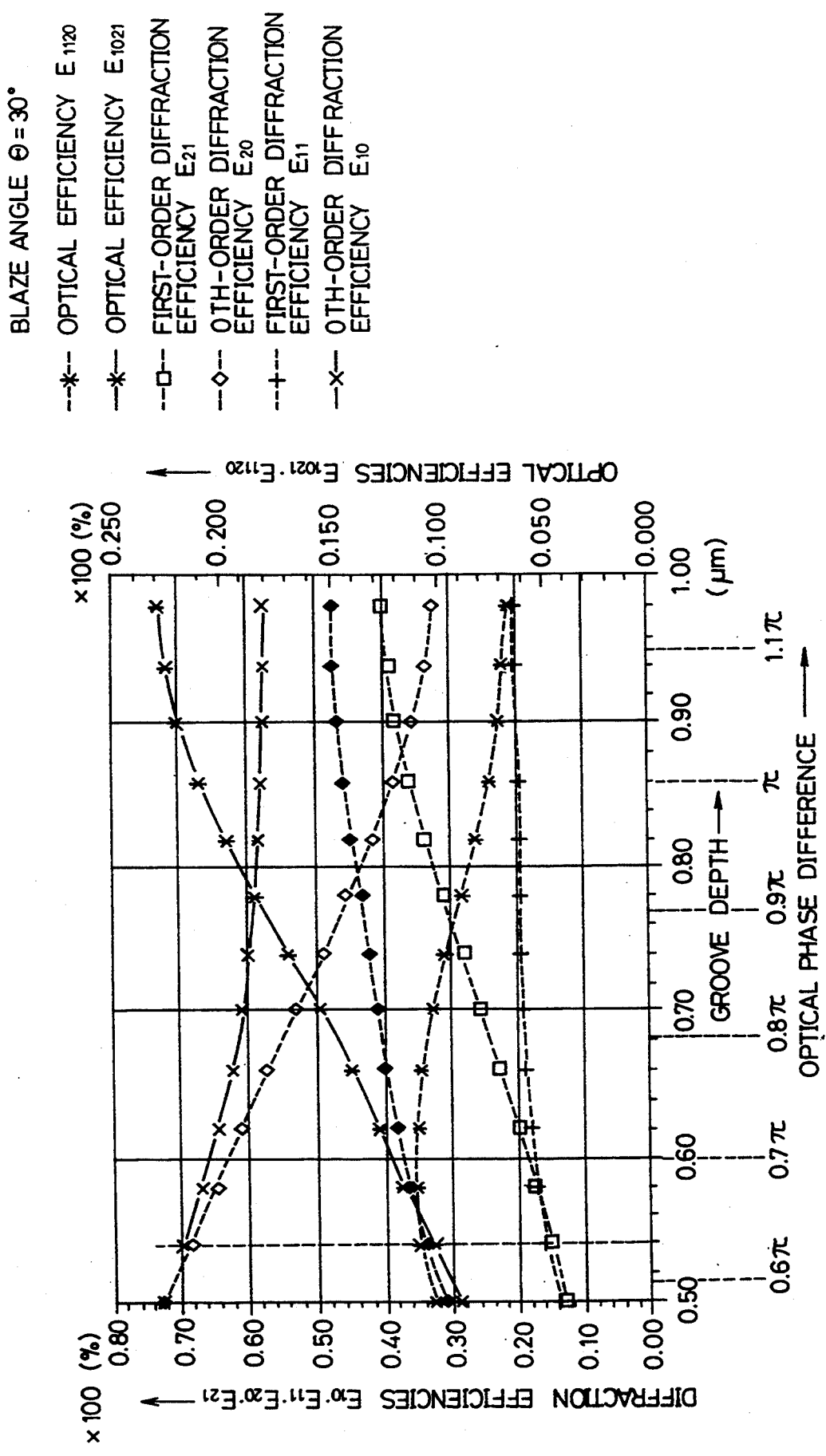
FIG. 8(d) shows the case where the groove tilt angle is 30° and FIG. 8(e) shows the case where the groove tilt angle is 45°.

In the case the groove tilt angle Θ was smaller than the allowable range, e.g. Θ=30°, the 0th-order diffraction efficiencies E$_{10}$ and E$_{20}$ became substantially equal, the first diffraction efficiencies E$_{11}$ and E$_{21}$ became substantially equal, when the groove depth t was 0.54 μm and the optical phase difference was $0.63\eta$ as shown in FIG. 8(d). At that time, the optical efficiencies E$_{1021}$ and E$_{1120}$, however became about 10.5% which was below the optimum value (12%).

Figure 8E:
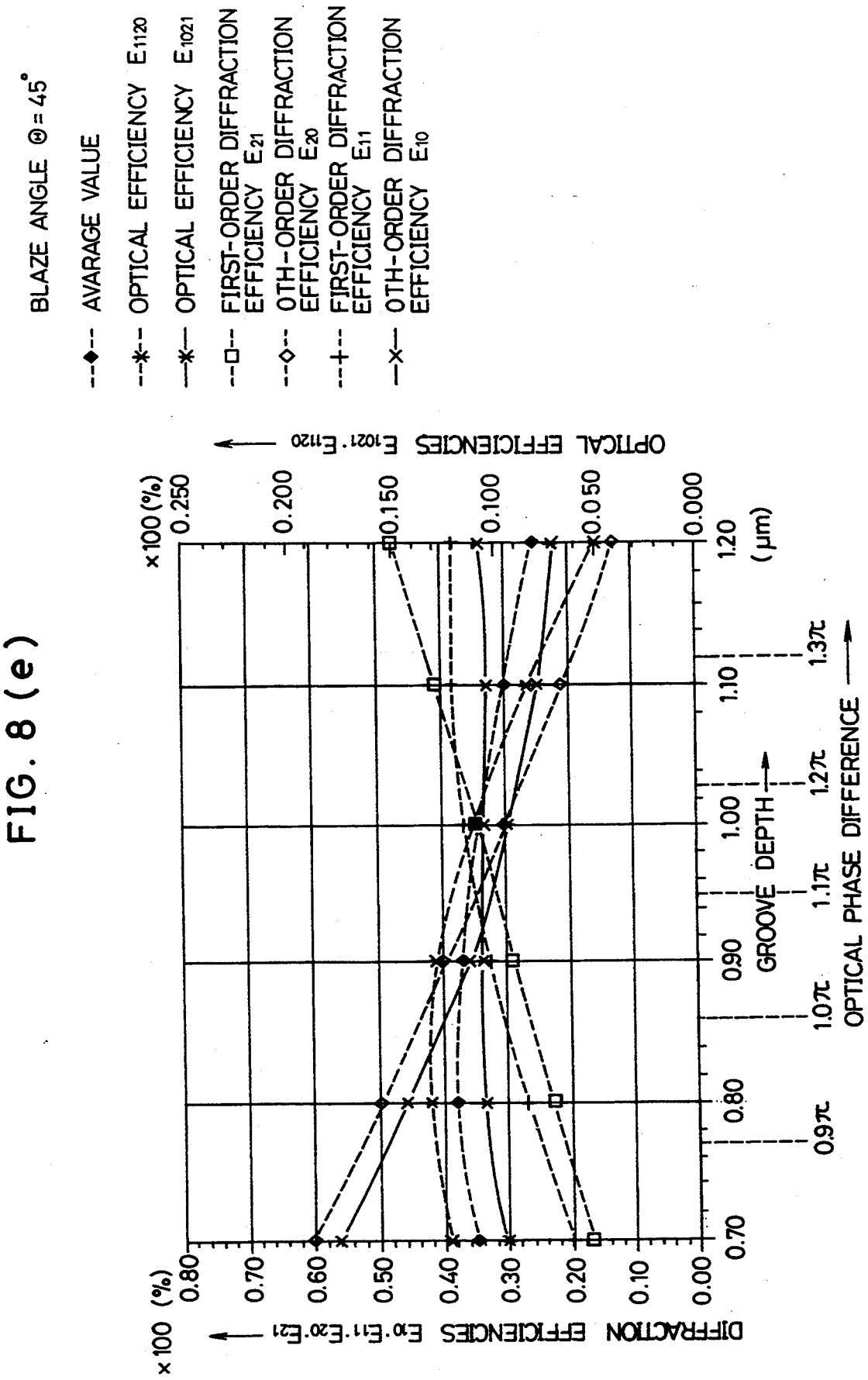

In the case the groove tilt angle Θ was above the allowable range, e.g. Θ=45°, the 0th-order diffraction efficiencies E$_{10}$ and E$_{20}$ became substantially equal, the first diffraction efficiencies E$_{11}$ and E$_{21}$ became substantially equal, when the groove depth t was 1.00 μm and the optical phase difference was $1.16\eta$ as shown in FIG. 8(e). The optical efficiencies E$_{1021}$ and E$_{1120}$, however, became about 10.5% which was below the optimum value (12%) like the above case.

When the relation among the optical efficiencies E$_{1021}$ and E$_{1120}$, groove tilt angle Θ and optical phase difference are analyzed from the above cases, the results shown in the graph of FIG. 9 are obtained. As apparent from FIG. 9, the optical efficiencies $E_{1021}$ and $E_{1120}$ of the optical diffraction grating element 8 are 12% or more on condition that the optical phase difference caused depending on the groove depth t is in the range of $0.7\eta$ to $1.1\eta$. At that time, the groove tilt angle $\Theta$ is in the range of 34° to 42°. The most preferable higher values of the optical efficiencies $E_{1021}$ and $E_{1120}$ are obtained on condition that the optical phase difference is in the range of $0.81\eta$ to $0.95\eta$. At that time, the groove tilt angle $\Theta$ is in the range of 36° to 40°.

With such an arrangement, the 0th-order diffracted lights are focused on the recording track of the recording medium 5 with high accuracy, since the 0th-order diffraction efficiency $E_{10}$ in the region 8a of the optical diffraction grating element 8 is equal to the 0th-order diffraction efficiency $E_{20}$ in the region 8b thereof. The optical efficiencies $E_{1021}$ and $E_{1120}$ are equal in the optical diffraction grating element 8, so that the light amounts of the focused light spots $S_1$ and $S_2$ become equal. This enables a highly accurate tracking control when the optical diffraction grating element 8 is used in an optical recording/reproducing apparatus. Further, since the optical efficiencies $E_{1021}$ and $E_{1120}$ are both 12% or more, signal noise is reduced and high-quality video signals with a S/N ratio of at least 45 dB is easily obtained when the optical diffraction grating element 8 is used in the optical system of an optical pick-up device adapted to a video recording/reproducing apparatus.

Also, when the optical diffraction grating element 8 is used in the optical system of an optical pick-up device adapted to a compact disk player or the like, other members of the optical pick-up device are not overloaded and high quality read-out signals can be obtained without increasing the manufacturing cost.

Figure 10:
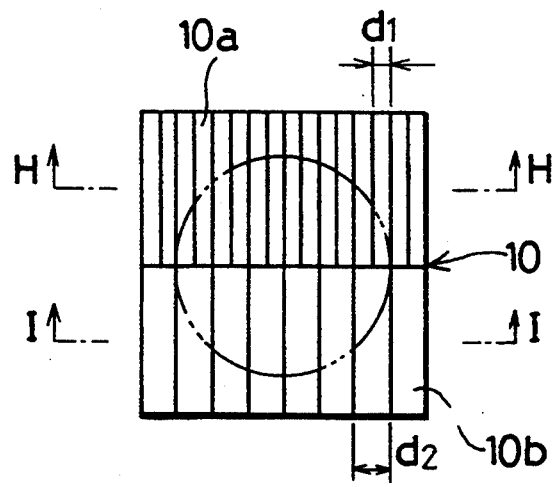
Figure 10B:
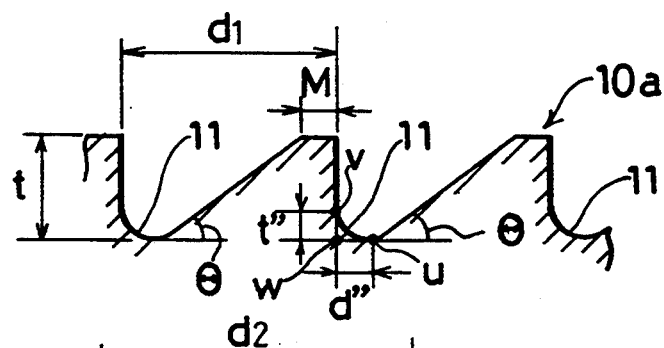
FIG. 10(b) is a section taken on line H—H in FIG. 10(a).
Figure 10C:
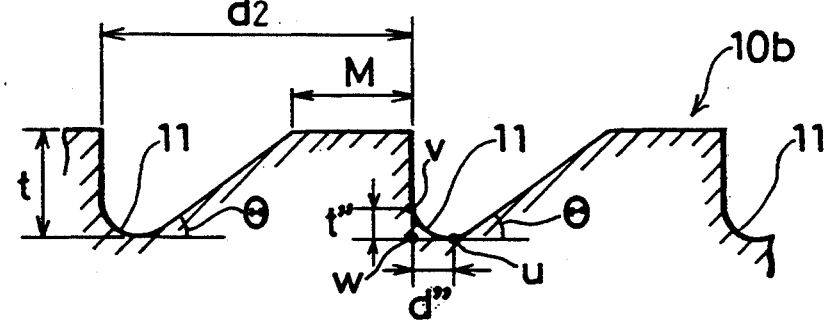
FIG. 10(c) is a section taken on line I—I in FIG. 10(a).

Now, reference will be made to FIGS. 10 to 12 for explaining another embodiment of the invention. As shown in FIG. 10(a), an optical diffraction grating element 10 according to the invention is comprised of regions 10a and 10b which include first and second diffraction gratings respectively. The first and second diffraction gratings have different grating pitches $d_1$ and $d_2$ like the optical diffraction grating element 2 in the first embodiment. When the optical diffraction grating element 10 is etched by ion beams made from e.g. $CF_4$ gas, grooves and flat lands positioned between the adjacent grooves are successively formed as shown in FIGS. 10(b) and 10(c) which illustrate the sectional configurations of the regions 8a and 8b respectively. These configurations possess a high diffraction efficiency. Each groove is made up of an inclined surface inclined at a groove tilt angle $\Theta$ and a curved surface 11 having a low curvature and a portion which faces to the inclined surface, being substantially perpendicular to the land surface. The tangent point u of the curved surface 11 and a horizontal line is positioned at the lower-most part of the curved surface 11. The upper portion of the curved surface 11 is raised from the intersection v of the curved surface 11 and a vertical line so as to make a substantially right angle with the land surface. When the intersection of the horizontal line and vertical line is represented by w; the distance between the tangent point u and intersection w is represented by d''; and the distance between the intersections v and w is represented by t'', the distances t'' and d'' are constants which define the configuration of the curved surface 11. In the case the optical diffraction grating element 10 is etched by ion beams made from $CF_4$ gas, the distances d'' in the regions 10a and 10b are about 10–20% of the grating pitches $d_1$ and $d_2$ respectively, while the distance t'' is about 20–40% of the groove depth t. Like the optical diffraction grating element 2 in the first embodiment, it is an essential characteristic for the optical diffraction grating element 10 that the diffraction gratings in the regions 10a and 10b are identical in the groove depth t and groove tilt angle $\Theta$. The grating pitch is varied in accordance with the land width M. In other words, the land width M of the region 10b is wider than that of the region 10a by the difference between the grating pitches $d_1$ and $d_2$ of the two regions. The sectional configurations of the grooves in the regions 10a and 10b are designed to be identical for the purpose of equalizing the 0th-order diffraction efficiencies in the regions 10a and 10b whose grating pitches are different, as well as equalizing the first-order diffraction efficiencies therein.

The following description discusses a preferable condition for the optical diffraction grating element 10 having the above curved surface 11.

Suppose the average of the grating pitch $d_1$ is $(2.2\pm 0.2)\alpha$ and the average of the grating pitch $d_2$ is $(2.8\pm 0.2)\alpha$ in the optical diffraction grating element 10, where $\alpha$ represents the wavelength of incident light. In this case, the optical phase difference is in the range of $0.65\eta$ to $1\eta$ and the groove tilt angle $\Theta$ is in the range of 32° to 43° when $\alpha=780$ nm and $n=1.454$. The groove tilt angle $\Theta$ and groove depth t are determined on condition that the above requirements are satisfied; and the 0th-order diffraction efficiency $E_{10}$ and first-order diffraction efficiency $E_{11}$ in the region 10a are substantially equal to the 0th-order diffraction efficiency $E_{20}$ and first-order diffraction efficiency $E_{21}$ in the region 10b respectively. In this case, the 0th-order diffraction efficiencies may deviate from each other within an allowable tolerance of $\pm 5\%$ and so may the first-order diffraction efficiencies. Compared with the optical diffraction grating element 2, in the optical diffraction grating element 10, the allowable range of the groove tilt angle $\Theta$ is narrower while the allowable range of the optical phase difference is wider, because of the above-described configuration.

In order to determine the optimum groove tilt angle $\Theta$ and groove depth t as described above, the groove tilt angle $\Theta$ was varied and meanwhile the relation was observed among the optical phase difference caused depending on the groove depth t; the 0th-order diffraction efficiency $E_{10}$ in the region 10a and 0th-order diffraction efficiency $E_{20}$ in the region 10b; the first-order diffraction efficiency $E_{11}$ in the region 10a and first-order diffraction efficiency $E_{21}$ in the region 10b; and the optical efficiencies $E_{1021}$ and $E_{1120}$ of the optical diffraction grating element 10. The following description describes the above results. In the graph of FIG. 10, the diffraction efficiency obtained when the groove depth (optical phase difference) is the calculated maximum value with the grating pitches $d_1$ and $d_2$ is plotted, for convenience, for the diffraction efficiency obtained when the groove depth is beyond the calculated maximum value.

Figure 11A:
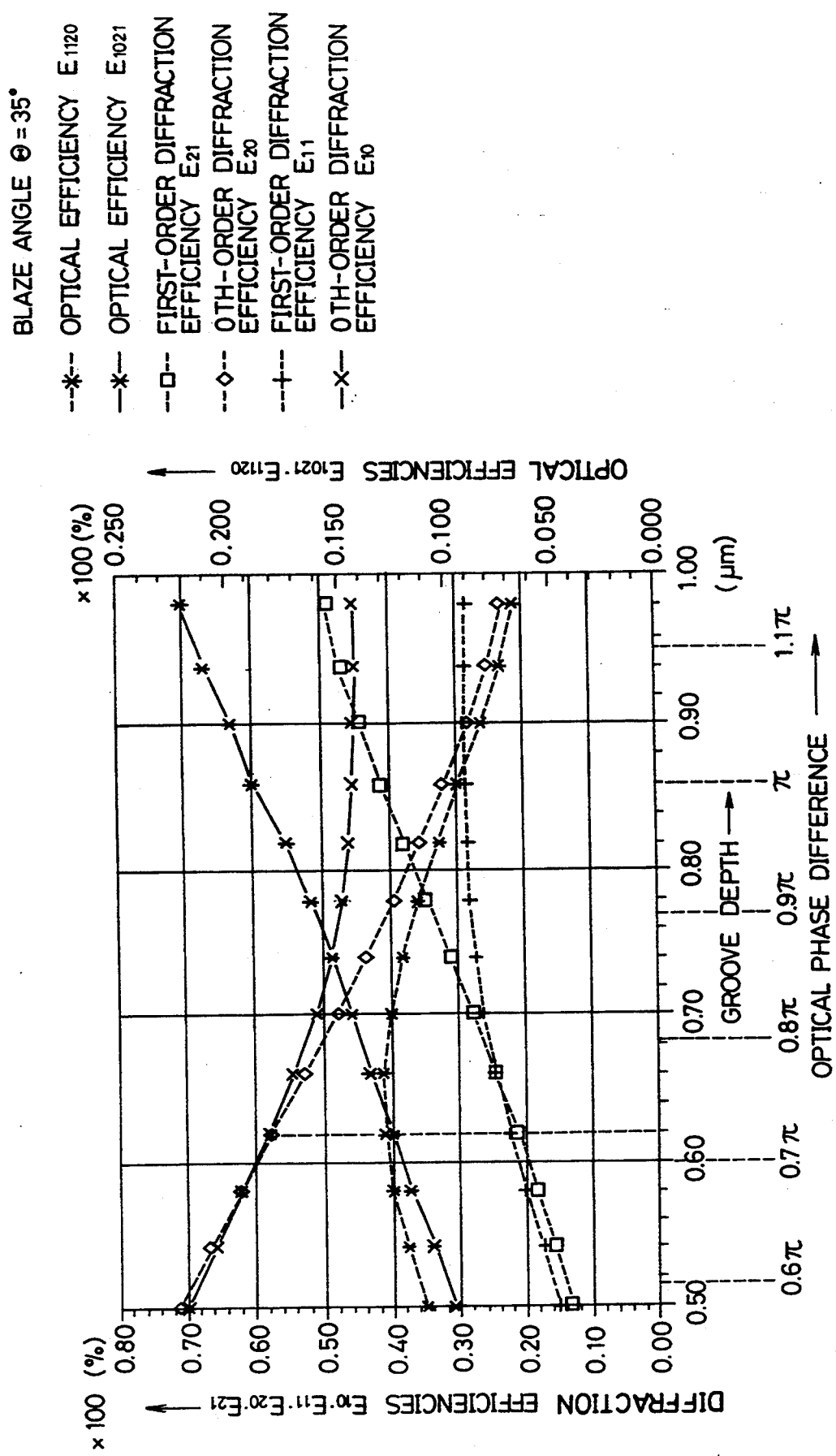
FIG. 11(a) shows the case where the groove tilt angle is 35°.

The graph of FIG. 11(a) shows the dependence of the diffraction efficiencies on the groove depth t of the optical diffraction grating element 10 made of silica glass having a refractive index of 1.454. In the case the groove tilt angle $\Theta=35°$, when the groove depth t was in the vicinity of 0.62 $\mu$m (this groove depth t causes an optical phase difference of approximately $0.72\eta$), the 0th-order diffraction efficiency $E_{10}$ in the region 10a and 0th-order diffraction efficiency $E_{20}$ in the region $10b$ were substantially equal, the first diffraction efficiency $E_{11}$ in the region $10a$ and first diffraction efficiency $E_{21}$ in the region $10b$ were substantially equal, and both optical efficiencies $E_{1021}$ and $E_{1120}$ of the optical diffraction grating element 10 are about 13.0%.

Like the optical diffraction grating element 2, when the optical diffraction grating element 10 is used for e.g. a video signal recording/reproducing apparatus, it is preferable to obtain the optical efficiencies $E_{1021}$ and $E_{1120}$ of 12% or more in order to obtain high quality video signals.

Figure 11B:
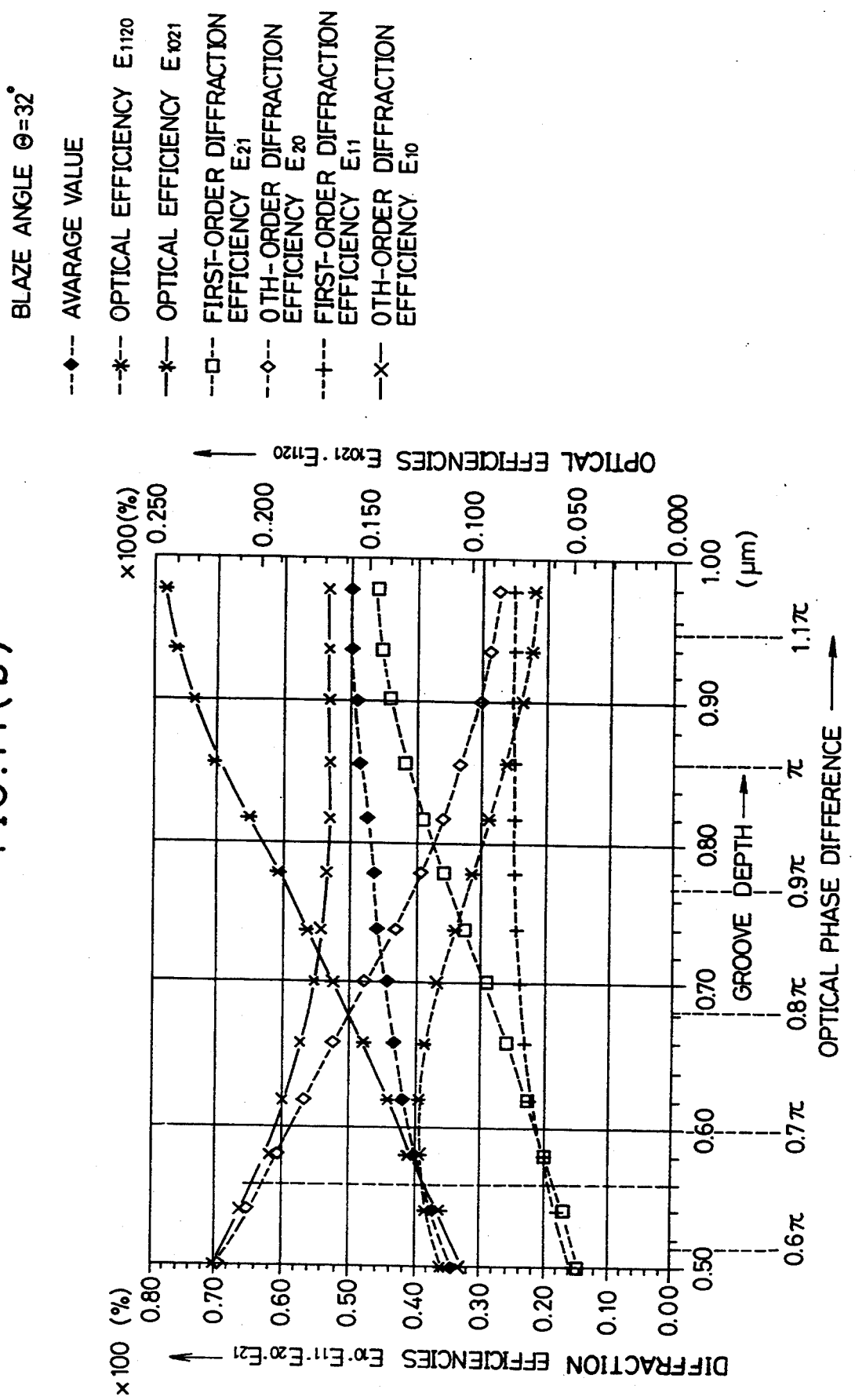
FIG. 11(b) shows the case where the groove tilt angle is 32°.

In the case the groove tilt angle $\Theta$ was the lower limit of the above-mentioned allowable range (32° to 43°), that is, $\Theta = 32°$, when the groove depth t was 0.56 $\mu$m and the optical phase difference was $0.65\eta$, the 0th-order diffraction efficiencies $E_{10}$ and $E_{20}$ became substantially equal, the first diffraction efficiencies $E_{11}$ and $E_{21}$ became substantially equal, and the optical efficiencies $E_{1021}$ and $E_{1120}$ became 12% or more as shown in the graph of FIG. 11(b).

Figure 11C:
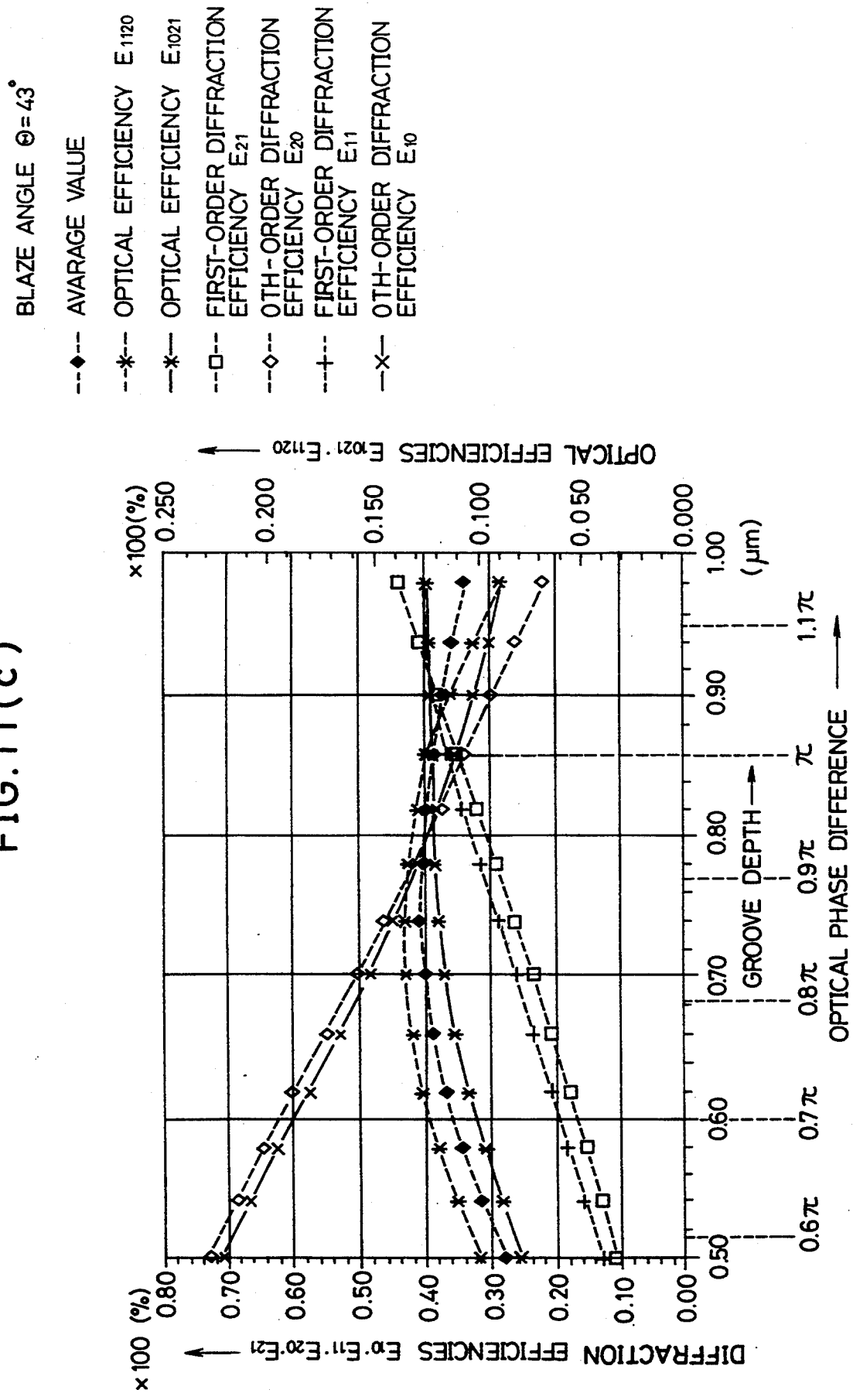
FIG. 11(c) shows the case where the groove tilt angle is 43°.

In the case the groove tilt angle $\Theta$ was the upper limit of the allowable range, that is, $\Theta = 43°$, when the groove depth was 0.86 $\mu$m and the optical phase difference was $1.00\eta$, the 0th-order diffraction efficiencies $E_{10}$ and $E_{20}$ became substantially equal, the first diffraction efficiencies $E_{11}$ and $E_{21}$ became substantially equal, and the optical efficiencies $E_{1021}$ and $E_{1120}$ became 12% or more as shown in the graph of FIG. 11(c).

Figure 11D:
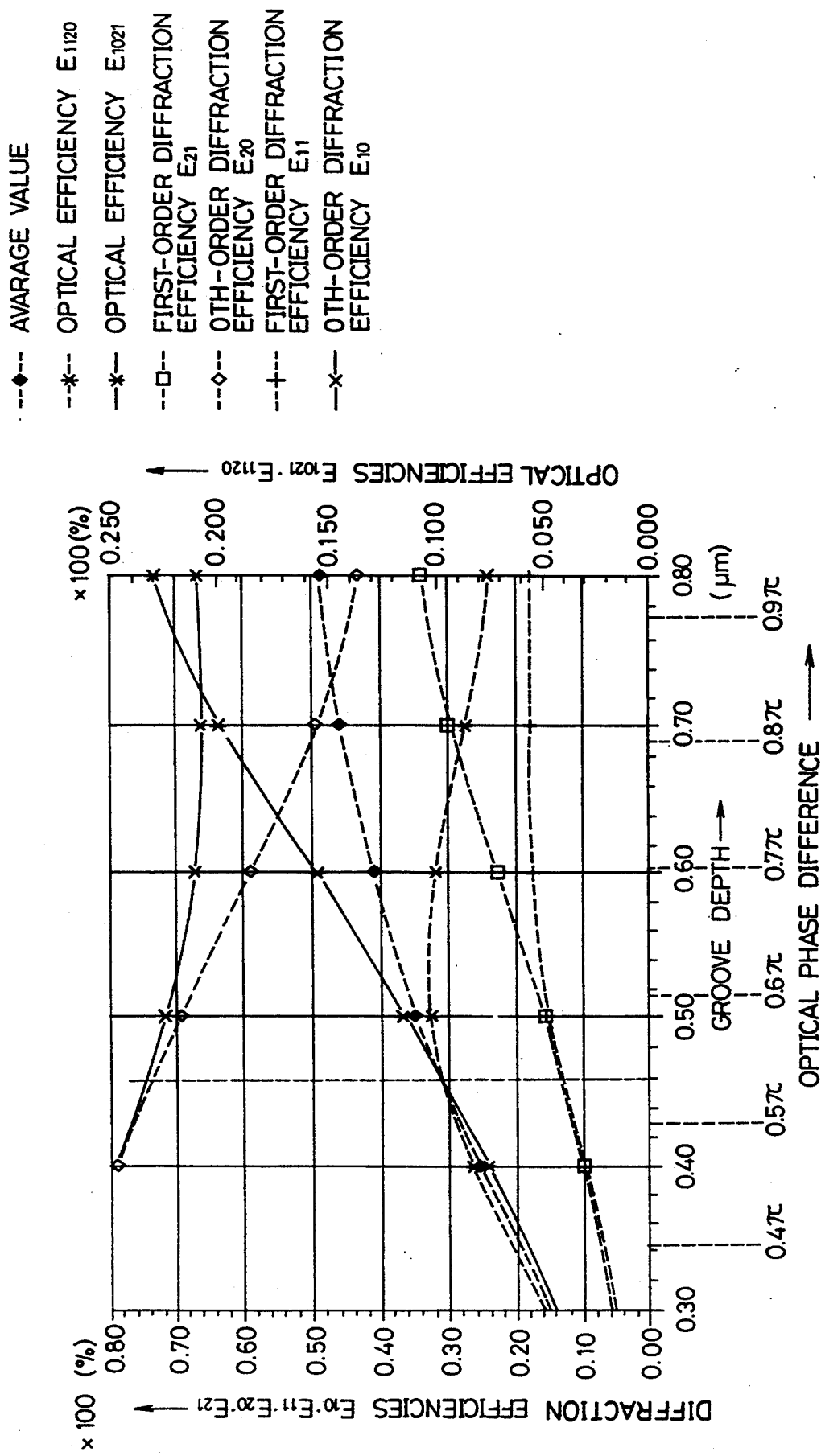
FIG. 11(d) shows the case where the groove tilt angle is 27° and FIG. 11(e) shows the case where the groove tilt angle is 47°.

In the case the groove tilt angle $\Theta$ was smaller than the allowable range, e.g. $\Theta = 27°$, the 0th-order diffraction efficiencies $E_{10}$ and $E_{20}$ became substantially equal, the first diffraction efficiencies $E_{11}$ and $E_{21}$ became substantially equal, when the groove depth t was 0.46 $\mu$m and the optical phase difference was $0.54\eta$ as shown in FIG. 11(d). At that time, the optical efficiencies $E_{1021}$ and $E_{1120}$, however, became about 10.0% which was below the optimum value (12%).

Figure 11E:
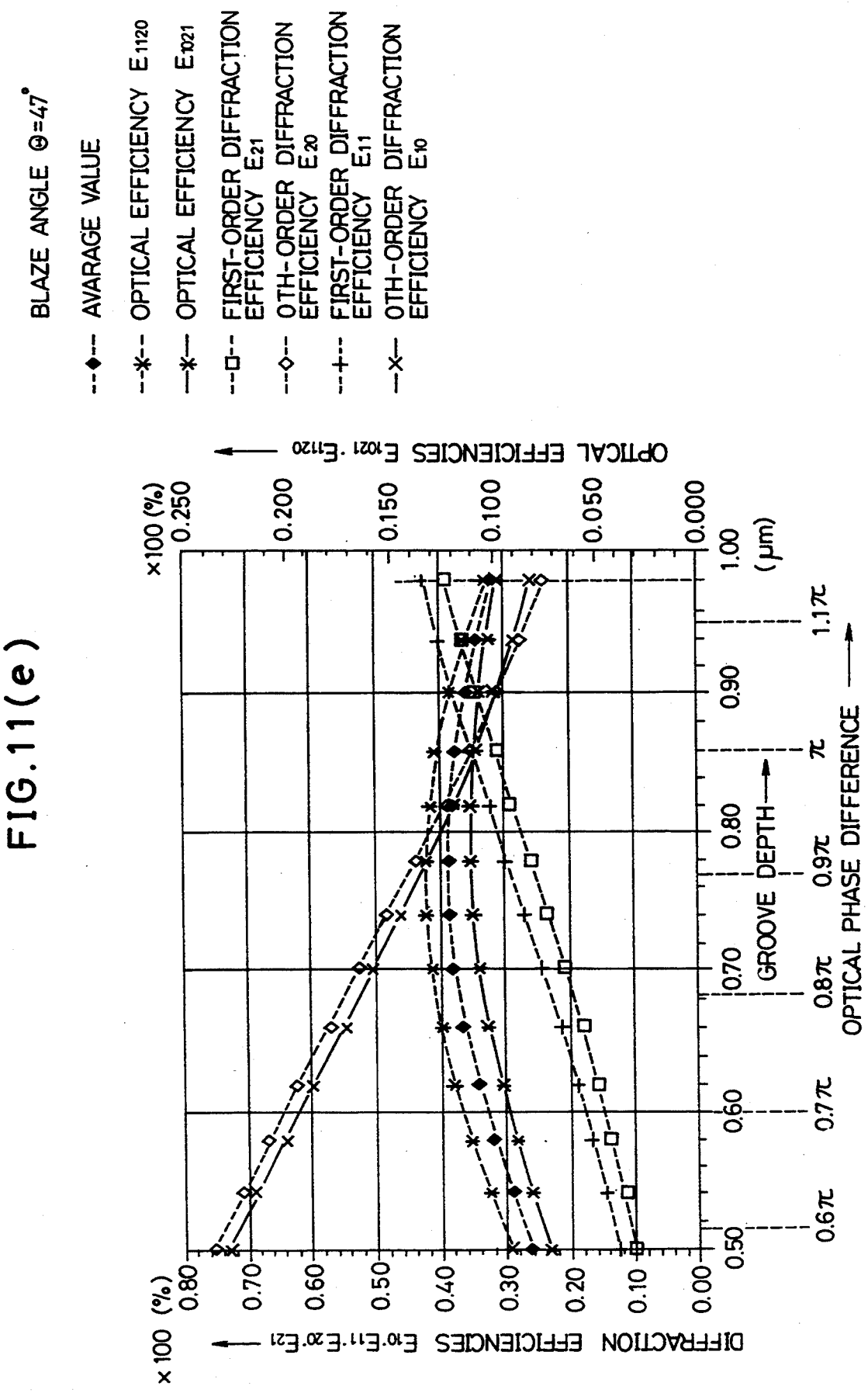

In the case the groove tilt angle $\Theta$ was above the allowable range, e.g. $\Theta = 47°$, the 0th-order diffraction efficiencies $E_{10}$ and $E_{20}$ became substantially equal, the first diffraction efficiencies $E_{11}$ and $E_{21}$ became substantially equal, when the groove depth t was 0.98 $\mu$m and the optical phase difference was $1.14\eta$ as shown in FIG. 11(e). The optical efficiencies $E_{1021}$ and $E_{1120}$, however, became about 10.0% which was below the optimum value (12%) like the above case.

Figure 12:
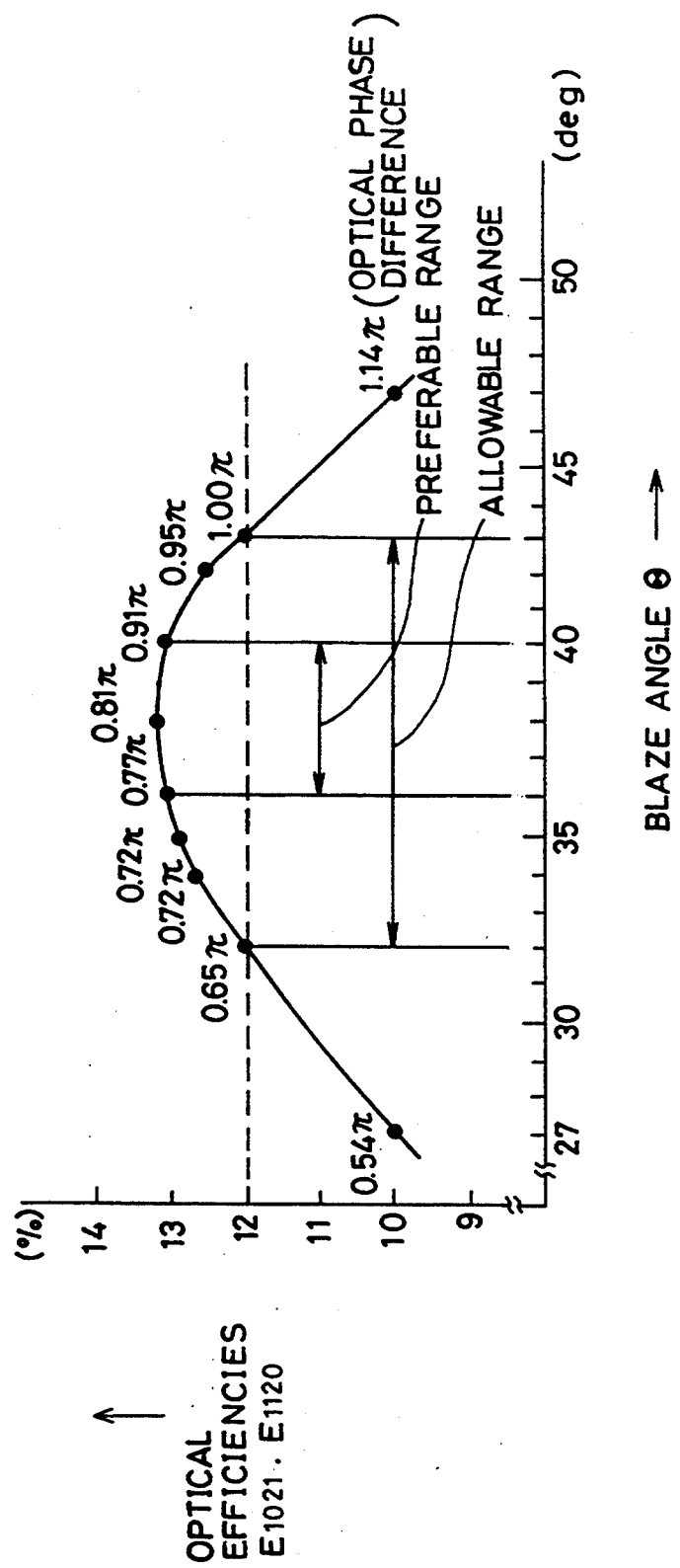

When the relation among the optical efficiencies $E_{1021}$ and $E_{1120}$, groove tilt angle $\Theta$ and optical phase difference are analyzed from the above cases, the results shown in the graph of FIG. 12 are obtained. As apparent from FIG. 12, the optical efficiencies $E_{1021}$ and $E_{1120}$ of the optical diffraction grating element 10 are 12% or more on condition that the optical phase difference is in the range of $0.65\eta$ to $1\eta$. At that time, the groove tilt angle $\Theta$ is in the range of 32° to 43°. The most preferable higher values of the optical efficiencies $E_{1021}$ and $E_{1120}$ can be obtained on condition that the optical phase difference is in the range of $0.77\eta$ to $0.91\eta$. At that time, the groove tilt angle $\Theta$ is in the range of 36° to 40°.

With such an arrangement, the 0th-order diffracted lights are focused on the recording track of the recording medium 5 with high accuracy similarly to the first and second embodiments, since the 0th-order diffraction efficiencies $E_{10}$ and $E_{20}$ in the regions $10a$ and $10b$ of the optical diffraction grating element 10 are equal. The optical efficiencies $E_{1021}$ and $E_{1120}$ are equal in the optical diffraction grating element 10, so that the light amounts of the focused light spots $S_1$ and $S_2$ which are to be formed on the light receiving element 6 become equal. This enables a highly accurate tracking control when the optical diffraction grating element 10 is used in an optical recording/reproducing apparatus. Further, since the optical efficiencies $E_{1021}$ and $E_{1120}$ are both 12% or more, signal noise is reduced and high-quality video signals with a S/N ratio of at least 45 dB is easily obtained when the optical diffraction grating element 10 is used in the optical system of an pick-up device adapted to a video recording/reproducing apparatus.

Also, when the optical diffraction grating element 10 is used in the optical system of an optical pick-up device adapted to a compact disk player or the like, other members of the optical pick-up device are not overloaded and high quality read-out signals can be obtained without increasing the manufacturing cost.

With reference to FIGS. 13 to 15, another embodiment of the invention will be explained below. In this embodiment, parts that function substantially similarly to those in the foregoing embodiments are indicated by the same numerals that are used in the foregoing embodiments, and the description thereof are omitted for simplicity.

This embodiment describes the case in which a diffraction grating element is employed in the laser beam scan section of an optical scan device. The optical scan device comprises, as shown in FIG. 13, the semiconductor laser 1, an optical diffraction grating element 12 having a plurality of diffraction gratings 13 (e.g. 8 diffraction gratings) and a motor 14 for rotating the the optical diffraction grating element 12.

Each diffraction grating 13 is in the form of a fan as shown in FIG. 14(a). As apparent from FIG. 14(b), the diffraction grating 13 includes grooves having a unsymmetrical V-shaped section and flat lands each positioned between the adjacent grooves, the grooves and lands being successively alternately formed. It is also an essential feature for this embodiment that the groove depth t, groove width L and groove tilt angle $\Theta$ are made constant while the grating pitch d is changed by making the land width M varied. The sections of the grooves are made identical for the purpose of having a constant 0th-order diffraction efficiency and first-order diffraction efficiency in the diffraction grating 13 even though the grating pitch d is varied.

As shown in FIGS. 13 and 14(a), one example of the diffraction grating 13 is designed to have a grating pattern coincident with interference fringes formed by the divergent light (spherical waves) from a focal point P' and the emitted light (spherical waves) from the semiconductor laser 1. The grating lines of the diffraction grating 13 overlap the arcs of concentric circles drawn around an external point P and the grating pitch d is gradually widened toward the external point P. The focal point P' is on an axis which is perpendicular to a plane, the plane including the land surfaces of the diffraction grating 13, and passes through the external point P. The diffracted light of the diffraction element 13 is accordingly converged onto the focal point P'.

A laser beam incident on the diffraction grating 13 is diffracted since the diffraction grating 13 is designed to function as a lens, and the focal point P' moves according to the movement of the diffraction grating 13 rotated by the motor 14, thereby performing clockwise scanning operation as shown in FIG. 13. At the instant the laser beam comes in the adjacent diffraction grating 13, the focal point P' immediately returns to the starting point from which the scanning operation has started. This movement is repeated so that during one rotation of the optical diffraction grating element 12 which comprises 8 pieces of diffraction gratings 13, 8 times of arced and approximately linear movement are performed. During the scanning operation, the amount of the laser beam diffracted at the diffraction grating 13 is maintained substantially constant thanks to the fact that the diffraction grating 13 has a sectional configuration which possesses a high diffraction efficiency, the same groove depth t, groove width L and groove tilt angle $\Theta$, even though the grating pitch d is varied.

The effects achieved by the above arrangement in which a linear scan by a laser beam is performed with the use of a plurality of diffraction gratings 13, may be obtained by the arrangement shown in FIG. 15. In the optical scan device shown in FIG. 15, the optical diffraction grating element 15 has a diffraction grating in which the depth and width of unsymmetrical V-shaped grooves and groove tilt angle are made constant while the grating pitch is varied by changing the land width, like the foregoing example. Similarly to tile case wherein the diffraction gratings 13 are employed, emitted light from the semiconductor laser 1 impinges on the optical diffraction grating element 15 and is diffracted thereat so as to be converged on the focal point P'. The focal point P' exists on an axis which is perpendicular to a plane including the land surfaces of the diffraction grating element 15 and passes through the external point P around which the grating lines are concentrically formed. The grating pitch is gradually widened toward the external point P. The optical diffraction grating element 15 is disposed such that a laser beam from the semiconductor laser 1 comes therein orthogonally to the flat surface of the land. The optical diffraction grating element 15 linearly reciprocates along the plane where the grating lines exist, so that the incident laser beam successively crosses the grating lines. In such an arrangement, a laser beam from the semiconductor laser 1 is diffracted and the focal point P' moves according to the movement of the optical diffraction grating element 15, thereby performing linear scanning operation. In this arrangement, the light amount of the laser beam diffracted at the optical diffraction grating element 15 is maintained to be substantially constant throughout the optical diffraction grating element 15.

As described above, the optical diffraction grating element according to the present invention comprises diffraction gratings having different pitches, the diffraction gratings having a configuration in which grooves and flat lands each positioned between the adjacent grooves are successively alternately formed, the diffraction gratings having the same groove depth, groove width, groove tilt angle and the substantially same 0th-diffraction efficiency and first-diffraction efficiency.

When such an optical diffraction grating element is provided in the optical system of an optical pick-up device adapted to a compact disk player, video disk player, optical recording/reproducing apparatus of both write-once type and rewritable type or the like, the light beam focused on a recording medium after passing through each region of the optical diffraction grating element is highly accurate, and therefore signals can be correctly detected, resulting in an improvement in the signal quality. In addition, the light amounts of a plurality of focused light spots formed on the light receiving element, such spots being formed by the light which have passed through each region of the optical diffraction grating element after being reflected at the recording medium, are equalized thereby to perform a highly accurate tracking control. The optical diffraction grating element is suitable to be used in the optical system of an optical pick-up device adapted to a video-signal recording/reproducing apparatus, since it has optical efficiencies high enough to produce a S/N ratio required for the video-signal recording/reproducing apparatus.

The optical pick-up device according to the present invention comprises an optical diffraction grating element, which guides a light reflected at the recording medium after being emitted from the laser source onto a light receiving element, positioned between a light source and a recording medium, the diffraction grating element including grooves having the same configuration as described above.

In the above arrangement, the light beam emitted from the light source is diffracted at the optical diffraction grating element to produce diffracted lights and the 0th-order diffracted light of them are focused on the recording medium with high accuracy. The optical diffraction grating element diffracts the reflected light from the recording medium to produce diffracted lights of the same light amount so that a plurality of focused light spots formed on the light receiving surface of the light receiving element have the same light amount. This permits the optical pick-up device to perform a highly accurate tracking control.

As a result, the signal quality is highly improved in the optical recording/reproducing apparatus to which the optical pick-up device of the invention is adapted.

Further, the optical scan device according to the present invention comprises a light source for emitting a light beam and an optical diffraction grating element having grooves of the same configuration, the light source and optical diffraction grating element being relatively movable to each other. The optical diffraction grating element diffracts a light beam emitted from the light source so that substantially linear scanning operation is performed in a predetermined direction, such a light beam being incident thereon when moving relatively to the light source.

In the above arrangement, when e.g. a recording medium is linearly scanned with the light beam diffracted at the optical diffraction grating element after being emitted from the light source, the light amounts of the diffracted beams obtained from the regions of the optical diffraction grating element are substantially equal. The optical scan device can accordingly supply a constant amount of light to the overall area to be scanned, and therefore the recording/reproducing apparatus can perform precise write/read operations on the recording medium.

The invention being thus described, it may be obvious that the same may be varied in many ways. Such variations are not to be regarded as a departure from the scope of the invention.

There are described above novel features which the skilled man will appreciate give rise to advantages. These are each independent aspects of the invention to be covered by the present application, irrespective of whether or not they are included within the scope of the following claims.

What is claimed is:

1. An optical scan device comprising:

a light source for emitting a light beam and an optical diffraction grating element relatively movable to the light source, for diffracting a light beam emitted from the light source when moving relatively to the light source so that linear scanning operation with the light beam is performed in a predetermined direction, the optical diffraction grating element comprises a plurality of diffraction gratings each having a grating configuration in which grooves and flat lands are successively alternately formed, each of the flat lands positioned between adjacent grooves, each diffraction grating having the same groove depth, groove width and groove tilt angle, the tilt angle being the inclined surface of the groove with respect to the plane which intersects the bottom of the groove and is parallel with the land surface, the diffraction gratings having different pitches, the different pitches formed by having a different land width for each diffraction grating.

2. The optical scan device according to claim 1, wherein the optical diffraction grating element is in the form of a disk and comprises a plurality of fan-shaped diffraction gratings each having grating lines coincident with interference fringes formed by divergent light from a point and divergent light from the light source, the point being on an axis which passes through an external point around which the grating lines are concentrically formed and is perpendicular to a plane including the land surfaces of the diffraction grating, and wherein the grating pitch is gradually widened toward the external point.

3. The optical scan device according to claim 1, wherein the optical diffraction grating element comprises a diffraction grating having grating lines coincident with interference fringes formed by divergent light from a point and divergent light from the light source, the point being on an axis which passes through an external point around which the grating lines are concentrically formed and is perpendicular to a plane including the land surfaces of the diffraction grating, wherein the grating pitch is gradually widened toward the external point, and wherein the optical diffraction grating element is disposed such that a light beam from the light source comes therein orthogonally to the flat surface of the land, and linearly moves along the plane where the grating lines exist so that the incident laser beam successively crosses the grating lines.

* * * * *